US010896274B1

(12) United States Patent
Morency et al.

(10) Patent No.: US 10,896,274 B1
(45) Date of Patent: Jan. 19, 2021

(54) EXTREME CASES SAMPLING METHOD FOR IMPROVED VARIATION-AWARE FULL CUSTOM DESIGN

(71) Applicant: Synopsys, Inc., Mountain View, CA (US)

(72) Inventors: Guy Morency, Chapel Hill, NC (US); Donald John Oriordan, Sunnyvale, CA (US); Jonathan Lee Sanders, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/584,787

(22) Filed: Sep. 26, 2019

Related U.S. Application Data

(60) Provisional application No. 62/736,806, filed on Sep. 26, 2018.

(51) Int. Cl.
| | | |
|---|---|---|
| *G06F 30/30* | (2020.01) | |
| *G06F 30/3308* | (2020.01) | |
| *G06F 30/31* | (2020.01) | |
| *G06F 111/10* | (2020.01) | |

(52) U.S. Cl.
CPC .......... *G06F 30/3308* (2020.01); *G06F 30/31* (2020.01); *G06F 2111/10* (2020.01)

(58) Field of Classification Search
CPC .......... G06F 30/30; G06F 30/31; G06F 30/33; G06F 30/3308
USPC ........................................ 716/100, 101, 106
See application file for complete search history.

(56) References Cited

U.S. PATENT DOCUMENTS

| | | | | |
|---|---|---|---|---|
| 6,083,269 A * | 7/2000 | Graef et al. | .......... | G06F 30/327 703/14 |
| 7,003,420 B2 * | 2/2006 | Ur et al. | ................. | G06F 30/33 702/117 |
| 7,793,237 B2 * | 9/2010 | Bonaccio et al. | ...... | H01L 22/14 716/133 |
| 7,886,262 B2 * | 2/2011 | Chew et al. | ............ | G06F 30/39 716/132 |
| 8,443,313 B2 * | 5/2013 | Ward et al. | ........... | G06F 30/327 716/104 |
| 8,494,670 B2 | 7/2013 | McConaghy et al. | | |
| 8,954,908 B1 | 2/2015 | Liu et al. | | |
| 9,201,993 B2 | 12/2015 | Seningen | | |
| 9,524,365 B1 * | 12/2016 | Liu et al. | .............. | G06F 30/398 |

(Continued)

*Primary Examiner* — Sun J Lin
(74) *Attorney, Agent, or Firm* — Haynes Beffel & Wolfeld LLP; Warren S. Wolfeld; Andrew L. Dunlap

(57) ABSTRACT

The independent claims of this patent signify a concise description of embodiments. Roughly described, disclosed is technology for yield improvement of an integrated circuit device implementing a circuit design which includes, in a first verification, verifying adherence of the circuit design to a set of performance specifications, over a first set of test cases which include variations in a fabrication process variable or an environmental condition. The verification includes identifying, for each test case of the first set of test cases, an extent to which the circuit design satisfies one or more of the performance specifications of the set of performance specifications. A second circuit design is then developed to address corner cases identified in the first verification, and the second circuit design is then re-verified using only a subset of test cases having test cases fewer than test cases of the first set of test cases.

27 Claims, 38 Drawing Sheets

(56) References Cited

U.S. PATENT DOCUMENTS 9,836,564 B1* 12/2017 Zhang et al. ........... G06F 30/33
2014/0006570 A1* 1/2014 Loos et al. ............. H04L 43/50
709/220

* cited by examiner

| Outputs | Specifications | Scatter | Histogram | Q-Q | Parametric Reduction |
|---|---|---|---|---|---|
| Output ▼ | | | Expression | | |
| dc_gain | yvalue(db20(v(/vout)),100) | | | | |
| pm | phase_m(v(/vout),0) | | | | |
| ugf | gain1_f(v(/vout)) | | | | |
| Click to add | | | | | |

| Analysis | Type | En | Value |
|---|---|---|---|
| corners | | ✓ | |
| ▼ sweep temp | sweep | ✓ | POI: |
|    rangeType | | | POI |
|    poi | | | 30 40 50 |
|    stepType | | | Linear |
|    linearPoints | | | |
| ▶ Monte Carlo | Monte Carlo | ✓ | Iterations: 50 Start Iteration: 1 |
| ▶ ac | ac | ✓ | Sweep Variable: Frequency (Hz) |
| ▶ op | op | | Format: All |
| ▶ tran | tran | | Start Time: 0 Time Step: 0.1n Stop Time: 0.5n |

FIG. 6

```
Foreach Corner Ci
  Foreach Sweep Variable Si
    Foreach Sweep Variable Value Vi of Si
      Foreach Monte Carlo Index Mi
        RunSimulation(Ci,Si,Vi,Mi)
```

FIG. 9

```
Foreach Corner Ci
    Foreach Sweep Variable Si
        Foreach Sweep Variable Value Vi of Si
            Foreach Monte Carlo Group Gi
                Foreach Monte Carlo Index Mi within Group Gi
                    RunSimulation(Ci,Si,Vi,Gi,Mi)
```

| corner | temp | Monte_Carlo | dc_gain ac | pm ac | ugf ac | m10_vgs op | |
|---|---|---|---|---|---|---|---|
|  |  | Sweep | > 25 | > 82 | > 1.1M | None | No |
| vdd_1.3 | 30.0000 |  | 20.8798 | 96.3102 | 1.95418M |  |  |
|  | 40.0000 | 18 | 21.1079 | 96.1485 | 1.74310M |  |  |
| vdd_1.25 |  |  | 21.7349 | 96.5777 | 1.82981M |  |  |
| vdd_1.3 | 30.0000 | 12 | 21.7791 | 96.3138 | 1.99084M |  |  |
| vdd_1.2 |  |  | 21.9898 | 97.0999 | 1.68791M |  |  |
| vdd_1.25 | 40.0000 | 18 | 22.0182 | 96.4299 | 1.63834M |  |  |
| vdd_1.3 | 50.0000 |  | 22.1186 | 95.9054 | 1.58441M |  |  |
| vdd_1.25 | 30.0000 | 12 | 22.8039 | 96.7704 | 1.86272M |  |  |
| vdd_1.2 | 40.0000 | 18 | 22.9545 | 96.9442 | 1.51798M |  |  |
| vdd_1.3 |  | 12 | 22.9676 | 96.0835 | 1.77727M |  |  |
| vdd_1.25 | 50.0000 | 18 | 23.0831 | 96.2127 | 1.47522M |  |  |
| vdd_1.3 |  | 6 | 23.2010 | 95.8558 | 1.69282M |  |  |
|  | 30.0000 | 34 | 23.7680 | 95.7283 | 1.88794M |  |  |
| vdd_1.2 |  | 12 | 23.8641 | 97.5169 | 1.71570M |  |  |
| vdd_1.3 |  | 25 | 23.9696 | 94.8363 | 2.00678M |  |  |
| vdd_1.25 | 40.0000 | 12 | 24.0628 | 96.5687 | 1.68970M |  |  |
| vdd_1.2 | 50.0000 | 18 | 24.1045 | 96.7269 | 1.37258M |  |  |
| vdd_1.25 | 30.0000 | 6 | 24.1847 | 96.1787 | 1.55678M |  |  |
| vdd_1.3 | 40.0000 |  | 24.3417 | 95.4975 | 1.50494M |  |  |
|  | 50.0000 | 12 | 24.3858 | 95.8018 | 1.56553M |  |  |
| vdd_1.25 | 30.0000 | 34 | 24.6857 | 96.4339 | 1.75341M |  |  |
| vdd_1.2 | 40.0000 | 12 | 25.2323 | 97.3125 | 1.54508M |  |  |
|  | 30.0000 | 6 | 25.3159 | 96.9198 | 1.40714M |  |  |
| vdd_1.25 |  | 25 | 25.3482 | 95.2236 | 1.87431M |  |  |
| vdd_1.3 |  | 34 | 25.4001 | 95.4679 | 1.68521M |  |  |
| vdd_1.25 | 40.0000 | 6 | 25.4364 | 96.0166 | 1.38974M |  |  |
| vdd_1.3 |  | 25 | 25.4910 | 94.6118 | 1.79045M |  |  |
| vdd_1.25 | 50.0000 | 12 | 25.5529 | 96.3193 | 1.50413M |  |  |
| vdd_1.3 | 30.0000 | 20 | 25.5670 | 95.0544 | 1.88204M |  |  |
| vdd_1.2 |  | 34 | 25.6819 | 97.4262 | 1.60202M |  |  |

| Analysis | Type | En | Value |
|---|---|---|---|
| Debug Cases | | ✓ | Total iterations:14, enabled: 14 |
| corners | | | Total:3, enabled: 3 |
| ▶ sweep temp | sweep | | POI: |
| ▶ Monte Carlo | Monte Carlo | | Iterations: 50 Start iteration: 1 |
| ▶ ac | ac | ✓ | Sweep Variable: Frequency (Hz) |
| ▶ op | op | | Format: All |
| ▶ tran | tran | | Start Time: 0 Time Step: 0.1n Stop Time: 0.5n |

FIG. 24

| | case1_vdd_1.2 | case2_vdd_1.2 | case3_vdd_1.2 | case4_vdd_1.3 | case5_vdd_1.3 | case6_vdd_1.3 | case7_vdd_1.25 | case8_vdd_1.25 | case9_vdd_1.25 | Case iterations (enabled / total) 14/14 |
|---|---|---|---|---|---|---|---|---|---|---|
| temp | 30.0 | 40.0 | 50.0 | 30.0 | 40.0 | 50.0 | 30.0 | 40.0 | 50.0 | |
| VDDVAL | 1.2 | 1.2 | 1.2 | 1.3 | 1.3 | 1.3 | 1.25 | 1.25 | 1.25 | |
| MC_iterations | 18 | 41 | 7 14 30 41 47 | 12 18 | 18 | 18 | 18 | 18 | 41 | |

FIG. 26

```
# Initial PVT Sampling
Foreach Corner Ci
   Foreach Sweep Variable Si
      Foreach Sweep Variable Value Vi of Si
         Foreach Monte Carlo Index Mi
            RunSimulation(Ci,Si,Vi,Mi)

# Extreme Corner Generation
Generate/Edit Extreme Corners

# Design Modification/re-simulation loop
Foreach Design Modification
   Foreach Extreme Corner Ei
      Foreach Monte Carlo Index Mi in Ei
         RunSimulation(Ei,Mi)

# Final Verification
Foreach Corner Ci
   Foreach Sweep Variable Si
      Foreach Sweep Variable Value Vi of Si
         Foreach Monte Carlo Index Mi
            RunSimulation(Ci,Si,Vi,Mi)
```

FIG. 27

| Analysis | Type | En | Value |
|---|---|---|---|
| Debug Cases | | | Total iterations: 14, enabled: 14 |
| corners | | ✓ | Total: 3, enabled: 3 |
| ▶ sweep temp | sweep | ✓ | POI: |
| ▶ Monte Carlo | Monte Carlo | ✓ | Iterations: 50 Start Iteration: 1 |
| ▶ ac | ac | ✓ | Sweep Variable: Frequency (Hz) |
| ▶ op | op | | Format: All |
| ▶ tran | tran | | Start Time: 0 Time Step: 0.1n Stop Time: 0.5n |

FIG. 28

| index | n:@:vth |
|---|---|
| 1 | 0.    0. |
| 2 | -0.8014 |
| 3 | 0.4233 |
| 4 | -0.6784 |
| 5 | -1.5230 |
| 6 | -1.4751 |
| 7 | 0.4762 |
| 8 | 0.2302 |
| 9 | -0.9596 |
| 10 | -1.7790 |
| 11 | -0.8456 |
| 12 | -0.5155 |
| 13 | -0.1677 |
| 14 | 1.6995 |
| 15 | 0.8449 |

| index | n:@:vth |
|---|---|
| 1 | 0.    0. |
| 2 | -0.8014 |
| 3 | -1.3806 |
| 4 | 0.3053 |
| 5 | -0.9771 |
| 6 | 1.2686 |
| 7 | 0.6897 |
| 8 | 0.1727 |
| 9 | -0.1045 |
| 10 | -0.7176 |
| 11 | 1.1512 |
| 12 | -0.1949 |
| 13 | 0.3378 |
| 14 | 1.4046 |
| 15 | -1.0285 |

FIG. 32

```
# Initial PVT Sampling
Foreach Corner Ci
    Foreach Sweep Variable Si
        Foreach Sweep Variable Value Vi of Si
            Foreach Monte Carlo Index Mi
                Save Variation Terms to Sampling File
                RunSimulation(Ci,Si,Vi,Mi)

# Extreme Corner Generation
Generate Extreme Corners

# Design Modification/re-simulation loop
Foreach Design Modification
    Foreach Extreme Corner Ei
        Foreach Monte Carlo Index Mi in Ei
            Load Variation Terms from Sampling File
            RunSimulation(Ei,Mi)

# Final Verification
Foreach Corner Ci
    Foreach Sweep Variable Si
        Foreach Sweep Variable Value Vi of Si
            Foreach Monte Carlo Index Mi
                Load Variation Terms from Sampling File
                RunSimulation(Ci,Si,Vi,Mi)
```

FIG. 34

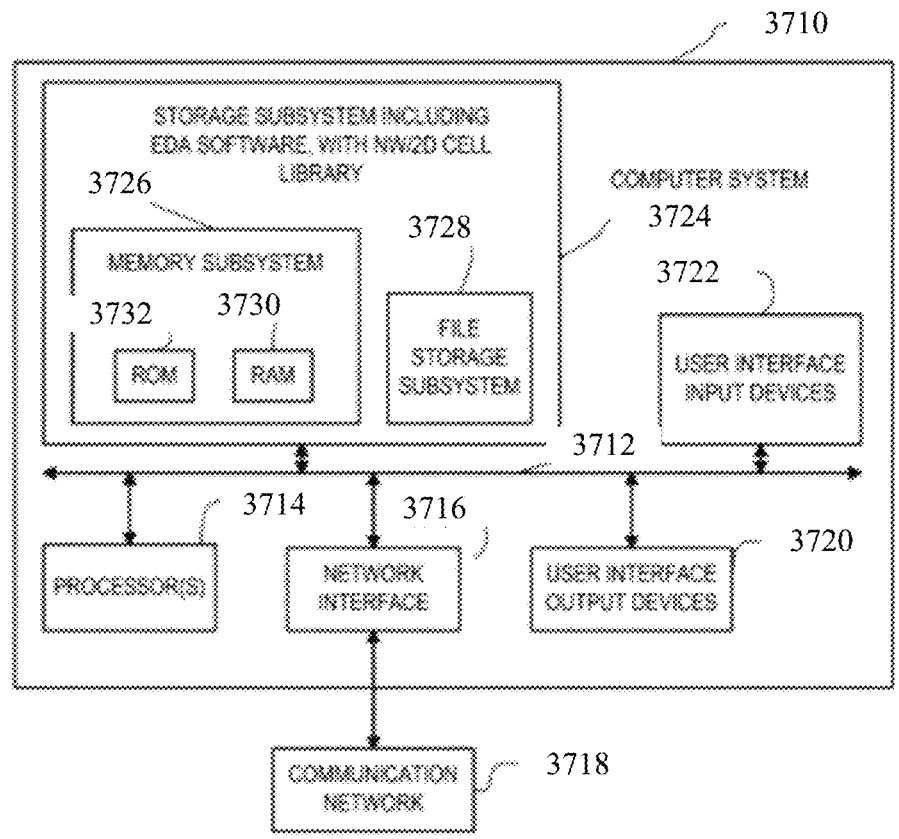
FIG. 37A
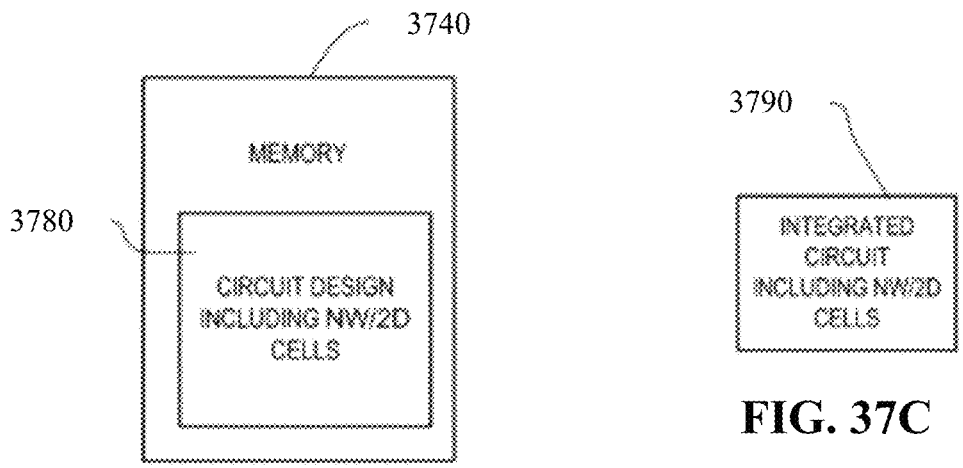
FIG. 37B
FIG. 37C

EXTREME CASES SAMPLING METHOD FOR IMPROVED VARIATION-AWARE FULL CUSTOM DESIGN

CROSS-REFERENCE TO OTHER APPLICATIONS

This application claims priority under 35 U.S.C. § 119(e) to U.S. Provisional Application No. 62/736,806, filed on Sep. 26, 2018, the entire contents of which are hereby incorporated by reference herein.

FIELD OF THE INVENTION

This invention relates to the modeling of integrated circuit devices in computer-aided design (CAD) and electronic design automation (EDA) systems, and more particularly to methods and systems for ensuring adherence of a circuit design to performance specifications across process and environmental variations.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments.

BACKGROUND

Variations in manufacturing processes, and environmental conditions such as operating voltage and temperature, have detrimental effects on Integrated Circuit (IC) performance. These variations are producing larger and larger effects as manufacturing process nodes continue to shrink and must be considered during the integrated circuit design and verification process. Therefore, it is common for IC designers, and for designers of analog and mixed signal IC's to perform circuit simulations in the presence of Process, Voltage and Temperature variations (hereafter PVT). Designers may 'sample' the Process variation space by means of a Parametric analysis, sweeping one or more parameters, by means of a Corner analysis (simulating the design at different Corner conditions which may be related to process corners or environmental corners), or (more increasingly at smaller geometry process nodes), by a Monte Carlo analysis (where the manufacturing process parameters are randomly sampled per known distributions). For robust circuit design, it is common to use all three methods at once, or various combinations of the three methods. Using all three methods at once is common in final circuit verification.

It is also typical for a circuit to be characterized by various measurements (such as gain and bandwidth for an operational amplifier to cite a simple example), and for these measurements to be affected by Process, Voltage, and Temperature variations (hereafter PVT) in different ways. For example, some measurements may tend to improve with increasing temperature while others may degrade, etc., leading to design tradeoffs. In the verification phase prior to tape out, a circuit designer will therefore typically perform many often-lengthy simulations over the full PVT space to verify that their circuit design operates within its intended specifications (including some margins) in the presence of these PVT variations.

It is however, common to find via such simulations that at certain 'extreme' PVT sample points, the circuit misbehaves or comes marginally close (perhaps too close for comfort) to not meeting its intended specifications. At that point, an iterative debug process begins, where the designer attempts to modify the circuit design to make it achieve its specifications and improve its performance across all PVT sample points, including those where it was previously found to fail or was marginally close to failing. After each trial design modification, the designer needs to know if the modification has improved the circuit performance across all the PVT variations, which involves many additional costly simulations. With standard flows enabled by the present state of the art, the entire set of PVT samples needs to be run again after each trial design modification.

There is a second problem with converging on a good design that works well across PVT variations when the Monte Carlo sampling method is used to represent the process variations. With modern circuit simulators, the actual sequence of random numbers generated by the circuit simulator as it samples the PVT space at each Monte Carlo iteration is typically a function of the design topology itself (random numbers representing process variations are generated by the simulator as each device in the circuit design is 'visited' by walking the design hierarchy).

Hence it becomes difficult to simulate a design involving circuit topology changes under the exact same sampled process conditions as before the topology change was introduced. Designers are often unaware of this and may think they are simulating the topologically-modified circuit using the exact same set of sampled values for the process parameter values as before for any given Monte Carlo iteration index, but in fact they will be different. In consequence, the designers can be misled by the new simulation results.

Since circuit topology changes are often required to meet specifications at PVT extremes (simply resizing the circuit devices or adding/removing transistor fins isn't sufficient), this problem can be quite prevalent.

SUMMARY

The claims signify a brief description of one or more of the innovations, embodiments, and/or examples found within this disclosure.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

Roughly described, modules are presented that significantly reduce the overall number of sample points and simulations needed to be performed to achieve a circuit design meeting its performance specifications across variations in PVT, while simultaneously avoiding the simulation pseudo-random number sequence problems that exist in the presence of design topology changes.

Roughly described, a solution includes:

The capturing of 'Extreme Case' PVT samples and associated Monte Carlo iterations after an initial set of PVT simulations are performed, based on simulated circuit performance measurement values.

A significantly reduced number of iterations (total simulations performed) in the design refinement process, by considering only the 'Extreme' case PVT samples during repetitive portions of the flow in which a circuit is being refined for improved yield.

The use of multiple pre-defined methods to allow different definitions of 'extreme' in extreme-case PVT sample generation per designer needs.

The automatic/designer assisted creation of 'extreme corners' corresponding to the captured extreme PVT sample points+associated Monte Carlo indices, based on specific simulated circuit performance measurement values.

The consideration of all, or only a certain subset of measurements when generating extreme corners.

The consideration of all circuit measurement tails, left tails only, or right tails only, on a per-measurement basis when generating extreme corners.

The Generation and Consumption of Monte Carlo Sampling File to use undisrupted random number sequence when simulating topologically modified circuits in full PVT simulation flow during circuit refinement.

The Generation and Consumption of Monte Carlo Sampling File to use undisrupted random number sequence when simulating topologically modified circuits in improved flow leveraging Extreme Case Corners during circuit refinement.

One or more embodiments of the invention or elements thereof can be implemented in the form of a computer product including a non-transitory computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIGS. 37A, 37B and 37C depict simplified block diagrams of a computer system suitable for use with embodiments of the technology, as well as circuit design and circuit embodiments of the technology.

Figure 1:
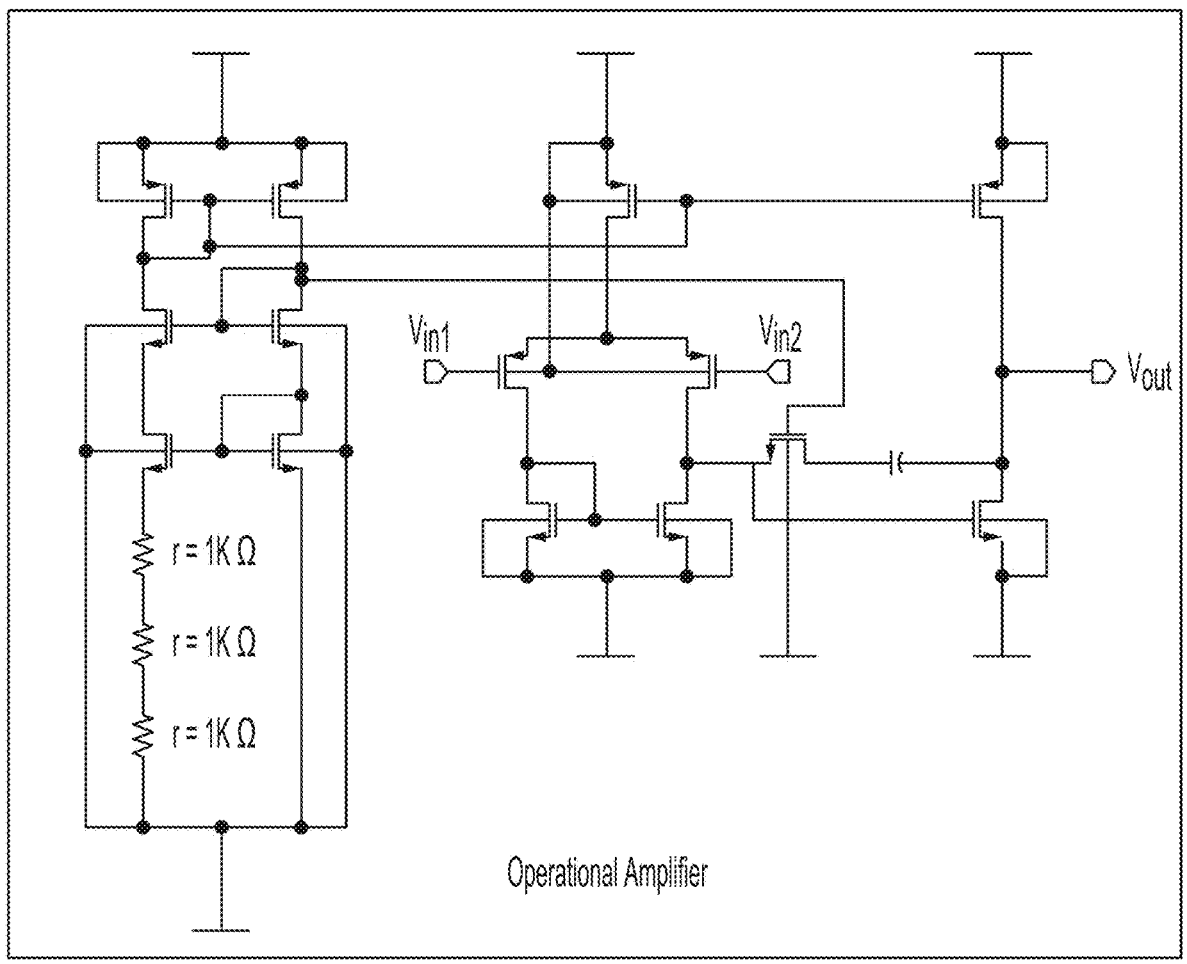
FIG. 1 Operational Amplifier Circuit Design

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The following Detailed Description, Figures and Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Solution Details

A solution is presented which significantly reduces the overall number of simulations performed in a circuit design and circuit/verification process. (As used herein, a "circuit design" is a transistor level design, after synthesis from VHDL or equivalent and before layout.) The solution is enabled by the automatic extraction of 'Extreme Case' corners and associated corner-specific subset of Monte Carlo Iteration Indices, based on simulated circuit performance measurements. A variety of pre-defined methods are presented which allow for convenient definitions of 'Extreme', ranging from circuits that fail to meet their measurement specifications, circuits which measurement values are in the measurement distribution 'tails', or extreme values of these. (As used herein, "performance specifications" and "measurement specifications" are used interchangeably.) During the circuit refinement stage to improve yield, only the extreme cases corners (and their associated corner-specific subsets Monte Carlo iteration indices) are considered when simulating trial modified circuits, before reverting to the full set of PVT samples for a final verification. This greatly reduces the overall number of simulations required during the circuit refinement/yield improvement process. The solution also employs a novel method to allow the same sampled process parameter values to be simulated for circuits which have been topically modified, allowing apples to apples comparisons when using both using the original CPU intensive flow and the improved flow described above. This is achieved by modifying the verification flow, such that the simulator is instructed to explicitly save a 'sample file' containing the process parameter variations (pseudo-random number sequence) for the initial unmodified circuit, and the instructed to re-use that sample file when simulating the topologically modified circuit in subsequent simulations.

The remainder of this document enumerates the various embodiments of the module in more detail.

Figure 2:
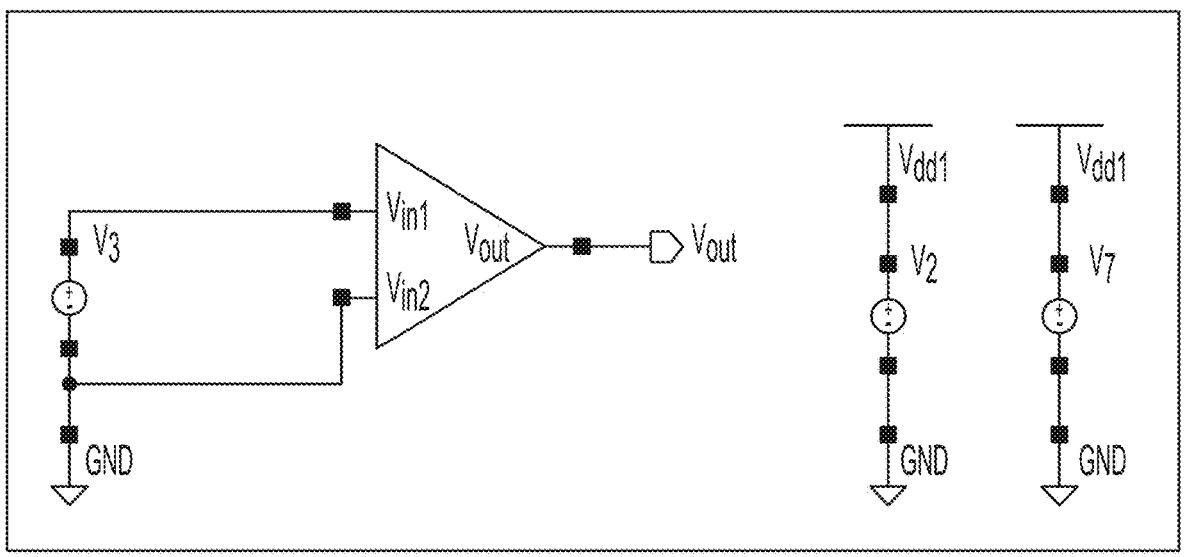
FIG. 2 Testbench for Opamp Frequency Domain Characterization

The testbench schematic for AC analysis (a frequency domain small-signal analysis) is shown in FIG. 2.

Note that in FIG. 2, the voltage source v2 is parameterized via the interpreted label construct 'vdc=VDDVAL V' (towards the right of the schematic). This voltage source is connected to the global power net vdd! The use of this construct parameterizes the voltage source value to a design variable called VDDVAL, for which values need to be provided elsewhere. The instance 'I0' of the OPAMP cell (the triangular symbol toward the center of FIG. 2) is also connected to a voltage source 'v3', and the global reference node gnd! is likewise connected to a voltage source 'v7', both of which are provided with fixed voltage values via their 'vdc' parameter value. These fixed sources are not parameterized, only the 'v2' source providing the vdd! signal value is parameterized in this example.

Performing the Initial Verification Run Over PVT Samples

Below is an example that shows how an operational amplifier circuit is verified over PVT variation after nominal simulations have been performed and accepted.

FIG. 1 shows an operational amplifier (OPAMP) circuit, which is comprised of MOSFET and resistor devices. To simulate the circuit and observe its response, a stimulus needs to be applied, in addition to hooking up the OPAMP power terminals to voltage sources.

The testbench schematic for AC analysis (a frequency domain small-signal analysis) is shown in FIG. 2.

Note that in FIG. 2, the voltage source v2 is parameterized via the interpreted label construct 'vdc=VDDVAL V' (towards the right of the schematic). This voltage source is connected to the global power net vdd! The use of this construct parameterizes the voltage source value to a design variable called VDDVAL, for which values need to be provided elsewhere. The instance 'I0' of the OPAMP cell (the triangular symbol toward the center of FIG. 2) is also connected to a voltage source 'v3', and the global reference node gnd! is likewise connected to a voltage source 'v7', both of which are provided with fixed voltage values via their 'vdc' parameter value. These fixed sources are not parameterized, only the 'v2' source providing the vdd! signal value is parameterized in this example.

To run simulations of the OPAMP circuit and testbench combination, the designer needs to provide additional information using a circuit design environment. The additional information includes operating conditions and analysis+ measurement specifications. An example such design environment is shown via the screenshot of FIG. 3.

Figure 3:
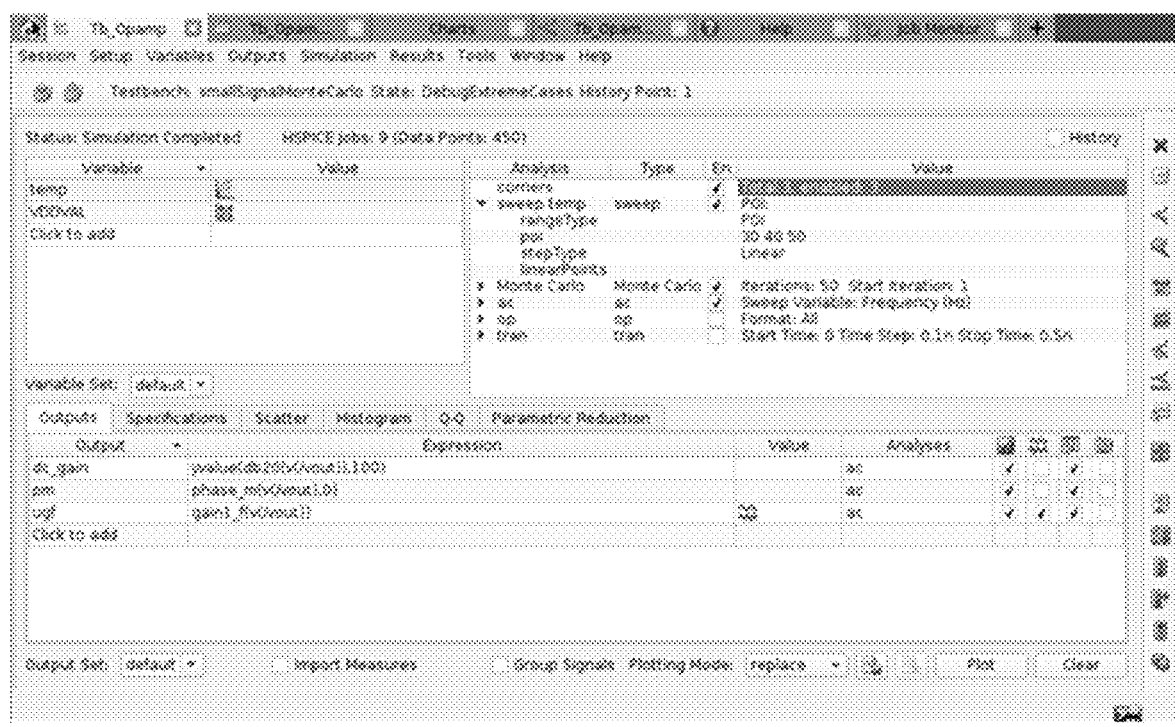
FIG. 3 Testbench Setup, including Temperature Sweeps, Voltage Corners, and Monte Carlo process variations for AC Analysis FIG. 4 Output Measurements for 3 AC Analysis Measurements FIG. 5 Specification Values for 3 AC Analysis Measurements FIG. 6 Analysis Setup Details, showing 3 Temperature Points of Interest, 3 Voltage Corners, and 50 Monte Carlo points FIG. 7 Details of Corner Setup to Sample Voltage Variations FIG. 8 Specification of Statistical Model Files FIG. 9 Generic Nested Loop Algorithm for Simulating over PVT with Corners, Sweeps and Monte Carlo FIG. 10 Algorithm that Splits Monte Carlo Simulations into Groups FIG. 11 Job Monitor showing 9 corners (×50 MC iterations)

In the design tool of FIG. 3, design variables such as VDDVAL (referenced by the testbench schematic of FIG. 2), circuit operating temperature, and process parameter values can be specified by the user. Some examples showing close-ups of this will be shown later.

With the inputs to the circuit specified, the designer next creates a list of desired circuit output measurements to characterize the circuit behavior. The example of FIG. 4 shows a total of 3 such output measurements, denoted by the following labels (seen in the Output column) of the figure.

dc_gain. This is a DC gain term, effectively the gain of the amplifier at very low frequencies. The given expression in the Expression column) allows the simulation environment to calculate this value from the raw circuit simulation results.

pm. This is the Phase Margin, another important characteristic of the amplifier circuit which can be measured by the given expression.

ugf. This is the Unity Gain Frequency, another important characteristic of an OPAMP circuit, and its given measurement expression is also provided. The UGF is the frequency at which the gain of the amplifier is one (unity). Gain varies as a function of frequency, typically degrading at higher frequencies.

Figure 5:
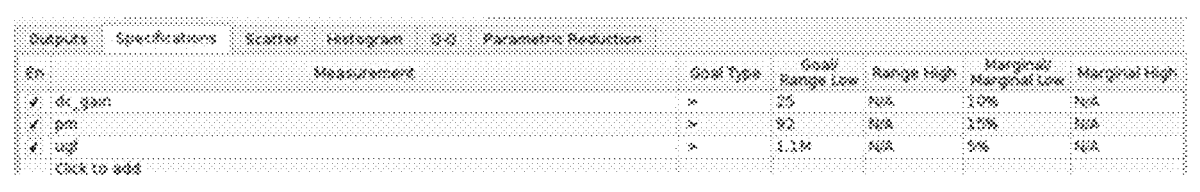

The circuit designer also typically inputs specification values for these various measurements. A circuit that fails to meet these values for the various output measurements is not considered a successful circuit and will have a detrimental effect on circuit yield. By way of example, the ugf/Unity Gain Frequency for this circuit is expected to exceed 1.1 MHz, as shown in the third row of FIG. 5 (see Goal/Range Low column).

To characterize the device over PVT variations, the designer provides some input on those variations. The example in the GUI of FIG. 6 shows the designer creating inputs in which the circuit operating temperature 'temp' is to be swept over 3 points of interest (POI) i.e. the values 30,40.50 degrees.

Figure 7:
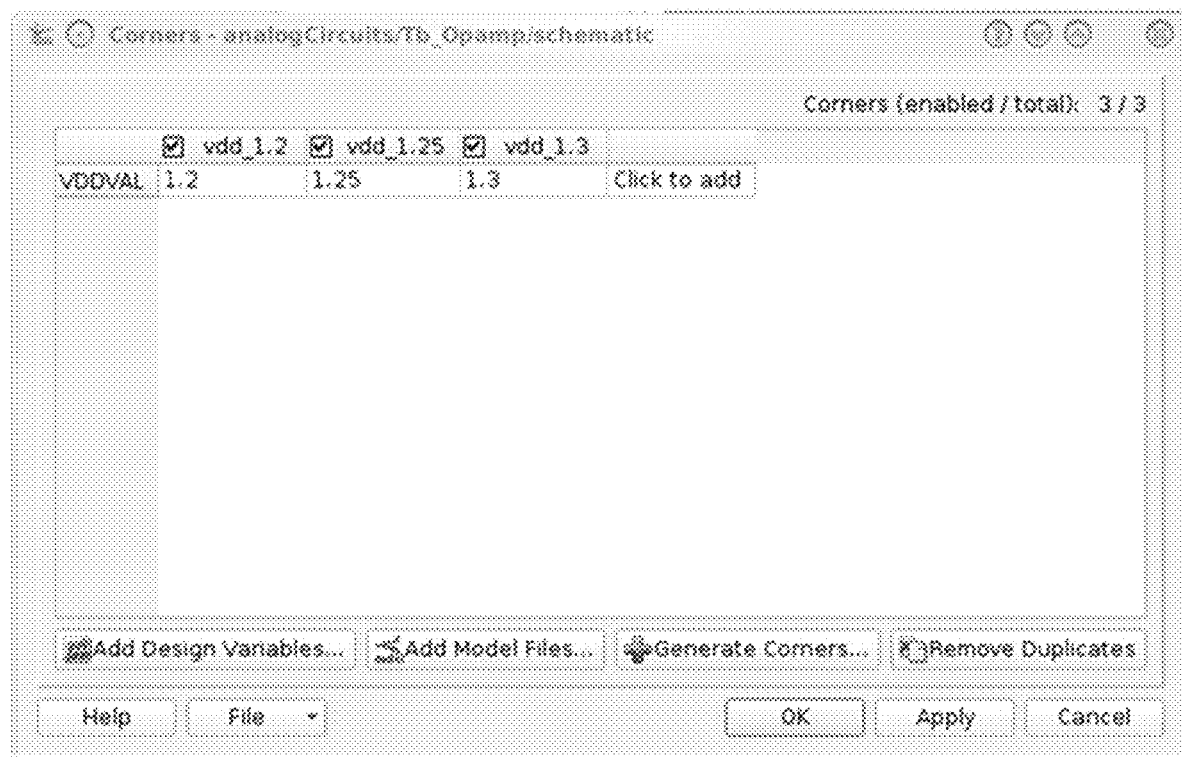

The designer may also provide variations in operating voltage and may use the design environment's 'Corners' tool to list these as shown in FIG. 7. In this example, three different values (1.22V, 1.25V, 1.3V) are provided for the VDDVAL parameter which governs the vdd! supply voltage for the design and testbench. Alternatively, the designer may choose to perform a sweep of the VDDVAL parameter. In general, however, a 'Corners' tool within the environment such as the one shown in FIG. 7 may allow the designer to define corner conditions involving multiple variables (in such a case, additional rows representing other variables may be added to the table. The columns then represent the corners. In this simple case of FIG. 7, very simple corners are created in which only a single operating voltage parameter VDDVAL is being varied.

Figure 8:
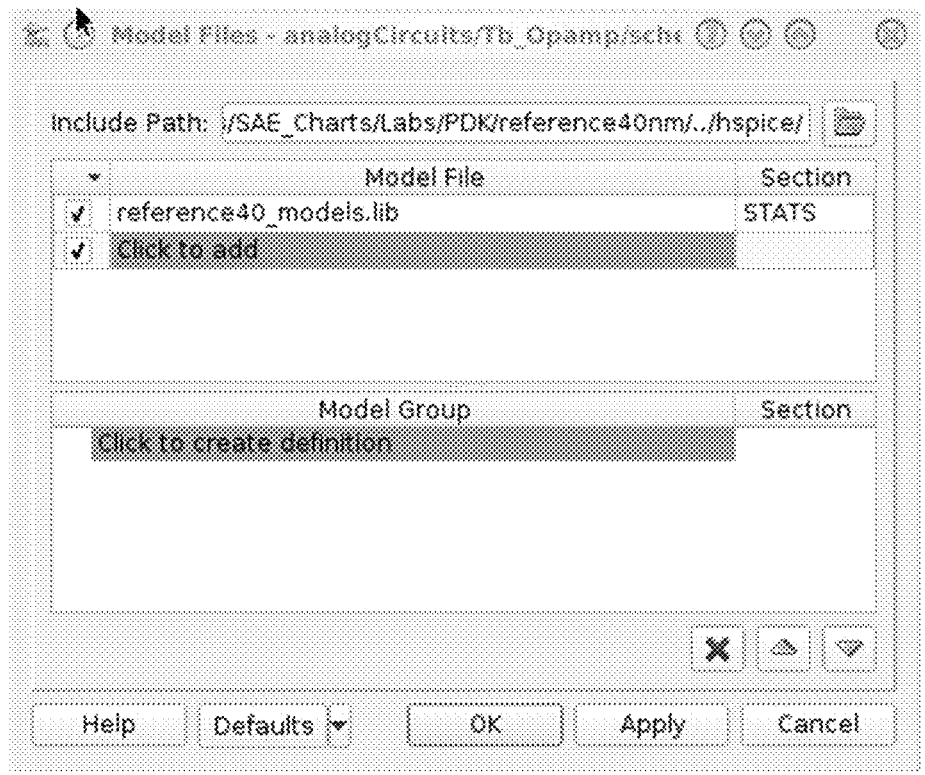

Designers may also specify process variations by instructing the simulator to include a certain model file supplied in the Process Design Kit (PDK), or portion thereof. A GUI screenshot showing this operation is shown in FIG. 8, in which the designer has selected the STATS' section of the model library. That portion of the model file contains the statistical parameter variations/distributions for the process parameters, encoded in a form that is understandable to the simulator.

With the instructions on how to sample the PVT variation space in place, the designer can also instruct the simulator on how to perform a Monte Carlo analysis. In such an analysis, the process parameters are varied by the simulator per the recipe in the previously cited statistical model file. FIG. 6 shows a Monte Carlo setup (second root level row in the hierarchical table) in which 50 randomly chosen sets of values are to be selected for the process parameters per the given distribution in the statistical model file.

FIG. 6 essentially shows how the designer has configured the environment to perform a sampling of PVT space, involving 3 voltage values (VDDVAL values specified via the 'Corners setup' of FIG. 7), 3 temperature values (as shown highlighted in the temperature sweep of FIG. 6), and 50 randomly chosen sets of process parameter values (the Monte Carlo analysis in FIG. 6). In this example, a total set of 3*3*50=450 PVT sample point simulations is to be performed.

A generic 'nested loop' algorithm for netlisting and running these simulations over PVT variation space as reflective of the current state of the art is as shown in FIG. 9.

It is common for the design environment to unroll some or all these loops and distribute these various simulations to be run across a grid computing environment to leverage parallelism, and it is also common for a design environment to instruct the simulator itself to perform the Monte Carlo data sampling i.e. the process-variation random number generation. It is also common to have the simulator itself perform the entire 'inner loop' (the Monte Carlo Index loop) or at least significant chunks thereof, particularly for smaller and relatively quickly simulating circuits. The grouping or 'chunking' algorithm is effectively as shown in FIG. 10, in which again the Monte Carlo index loop is performed within the simulator processes themselves, with a group of Monte Carlo iterations performed per simulation process. This allows the combined simulator startup time, license check time, netlist parsing and elaboration time (which can be a significant portion of the overall simulation cost for smaller circuits), to be amortized across multiple simulations, leading to increased efficiency.

To summarize, the Monte Carlo portion of the analysis is typically the 'inner loop' in this process, performed by the simulator itself with the voltage/temperature and any other environmental parameter values being performed by an outer loop or loops by the design environment. The Monte Carlo portion can also be divided among different simulation group processes, e.g. a first simulation process group simulating Monte Carlo iterations 1 thru 10, a second process group simulating Monte Carlo iterations 11 thru 20, etc. The grouping variation of the flow/algorithm is shown in FIG. 10, in which groups Gi are introduced.

Inspecting the Initial Simulation Results

Figure 11:
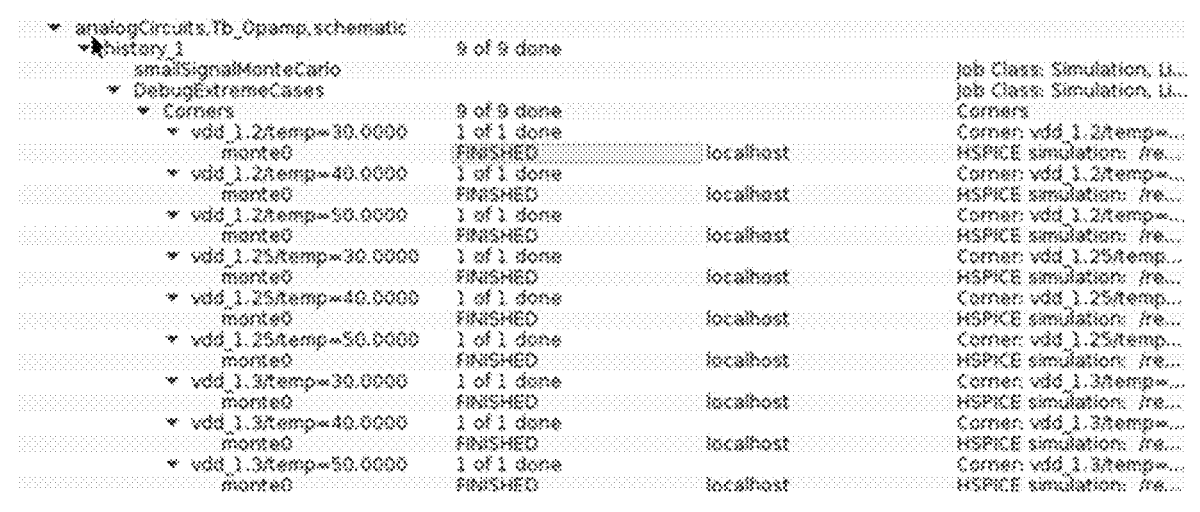

A design environment progress monitor may show a progress report such as that of FIG. 11 during and/or after the running of the actual simulations. In this case, the voltage corners were run in an outer loop, with the Monte Carlo variations for the process parameters being performed in an inner loop, hence the hierarchical structure of the results/progress reports. (In the example of FIG. 11 the designer chose to not perform the temperature sweep i.e. FIG. 11 does not directly correlate to the full setup of FIG. 6).

Once the simulations are complete, the design environment can present the simulation results to the user in various forms including tables and charts. FIGS. 12-15 indicate, among other things, the extent to which various test cases for which the preliminary implementation of the preliminary circuit design satisfies a performance specification in the set of performance specifications. As used herein, "least" satisfaction of a particular performance specification does not necessarily require that the relevant test case actually fail the particular performance specification.

Figure 12:
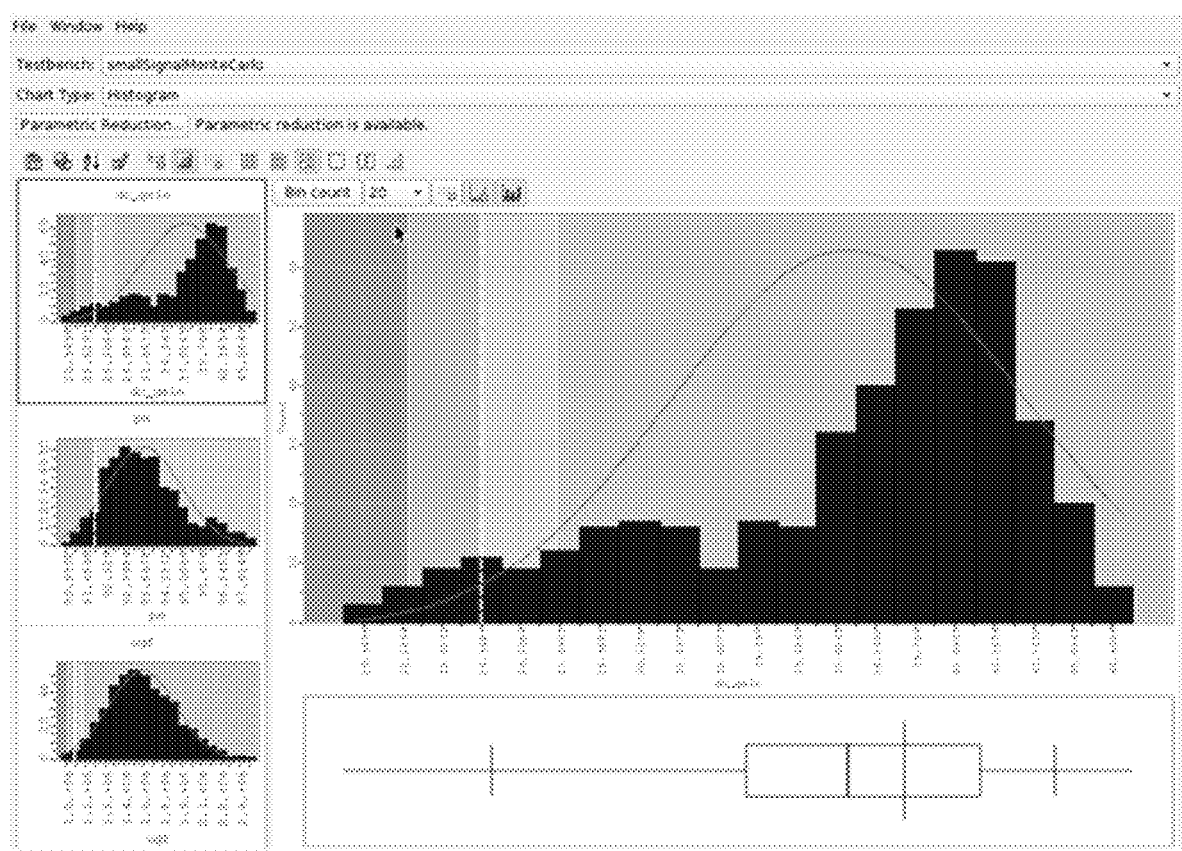
FIG. 12 Distribution of Measurement Values across PVT samples for DC Gain measurement FIG. 13 Tabular Results, sorted by DC Gain measurement values, showing DC Gain failure conditions FIG. 14 Summary Results for AC Measurements across PVT variations FIG. 15 Per-Corner Summary Results for AC Measurements across PVT Variations FIG. 16 CPU-Intensive Yield Improvement/Design Refinement Process FIG. 17 Optimized Flow Chart for Design Refinement using Extreme Corner Cases FIG. 18 Extreme Case Extraction Dialog, configured for All PVT samples involving a measurement Specification Failure FIG. 19 Process by which Designer Chooses, Refines, and (Optionally) Edits a Definition of 'Extreme Cases'

FIG. 12 shows a chart indicating how the OPAMP circuits 'dc_gain' (aka DC_GAIN) measurement varies in response to the PVT variations which were specified as inputs to the simulator. Here is a skewed distribution, with the points to the left of the histogram considered to be 'failing' PVT samples, as the DC_GAIN measurement are below spec. These Specification regions are shown in orange/pink. Those points that correspond to the green/lime background colors (right-most region) are considered as 'pass' PVT samples i.e. PVT samples for which the circuit is meeting specification for the DC_GAIN measurement at least. The yellow/orange regions (second region from left) are 'marginal' i.e. close to passing (in the case of the orange colored region), or close to failing (the lime colored region, second from right in the drawing). The left border of the screenshot shows previews for the other two measurements (PM and UGF), which again have distributions, though perhaps not as heavily skewed to the right.

The information can be presented in a tabular form as shown in FIG. 13. Different PVT sample points are represented by the different rows in the table (the first three columns show the power supply voltage, temperature and Monte Carlo sample index values respectively), while the remaining columns represent various circuit measurements. Passing value regions are again in green, failing values in red, marginally passing values in lime and marginally failing values in orange. The data has been sorted in increasing order of the DC_GAIN parameter, such that those sample points that resulted in the smallest DC_GAIN values (and hence failing specifications) are shown at the top of the table. These top-most rows of the table correspond to the correspondingly color coded regions in the histogram of FIG. 12.

Figure 14:
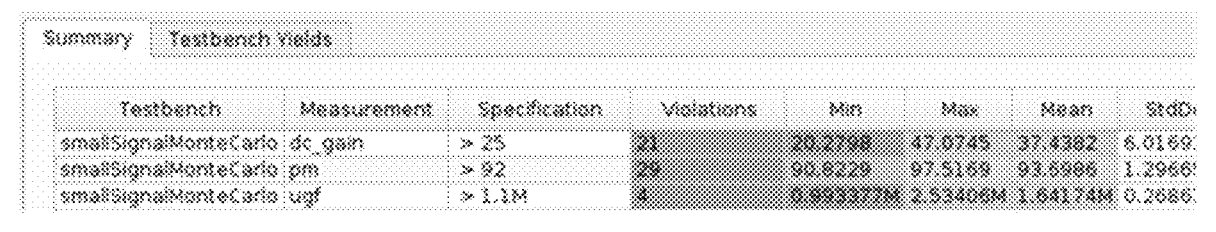

The design environment may also show aggregate or summary statistics across the entire PVT sample space, as shown in FIG. 14. Here it is seen the output measurements as rows, and specification values, the number of specification failures or 'violations' and various aggregate statistics such as min/max/mean values as the various columns. There were several violations, and 21 of the 450 simulations/sample points failed to meet the DC_GAIN specification, 29 failed to meet the Phase Margin PM specification, while only 4 simulations/sample points failed to meet the Unity Gain/UGF spec.

Figure 15:
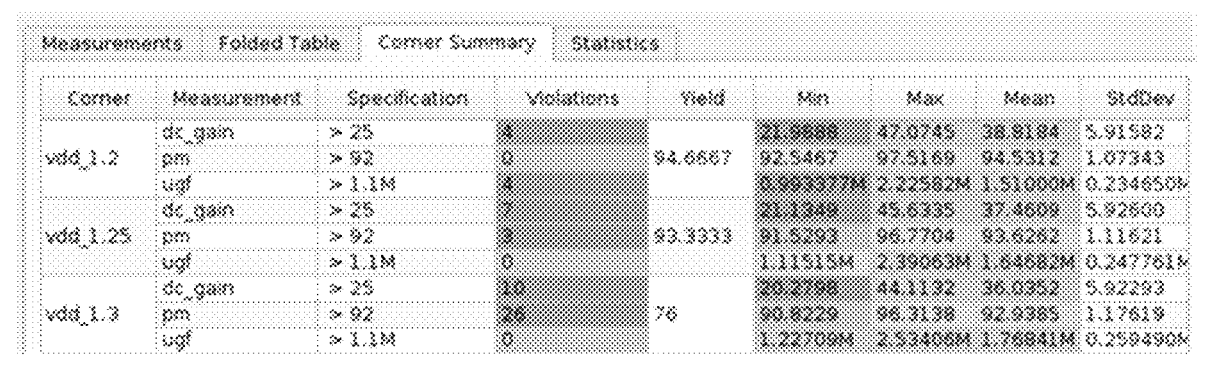

A per-corner summary may also be generated, as shown in FIG. 15.

At this point, the designer must digest this information, and depending on desired yield numbers, may have to figure out how to modify his/her circuit to improve its performance over PVT (to have fewer or perhaps even zero specification failures/violations) to further increase yield. Yield is the percentage of manufactured circuits that meet all specifications for all measurements across all PVT variations. This yield Improvement process may also require the designer to make some design tradeoffs (e.g. increase the number of UGF violations slightly while significantly reducing the number of violations for the other measurements/specs). The designer may be able to achieve this by resizing various devices in the design, adding/subtracting fins in FinFET devices, etc. The designer may not be able to achieve the desired yield by such resizing techniques alone and may also have to modify the topology of the circuit, inserting or removing devices, or groups of devices. After performing any of these incremental design changes to refine the circuit, the designer again needs to re-verify the modified circuit, to determine if the changes had the desired results.

Figure 16:
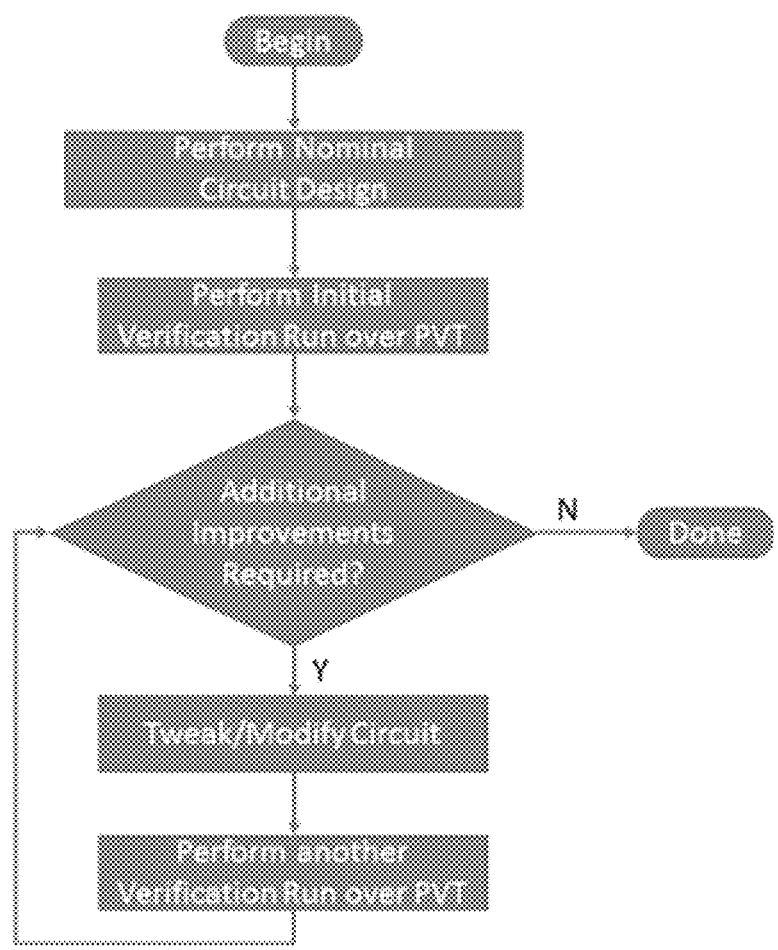

The simplest such incremental verification process is to run all 450 simulations again, following the simple flow of FIG. 16. However, this can be computationally expensive, especially when multiple successive design modifications are performed (450 simulations each time the 'Perform another Verification Run over PVT' is performed for this example).

Extraction of 'Extreme Corner' Debug Cases

An embodiment allows designers to make more rapid progress to a final design that performs/yields well over PVT variations, but involving substantially fewer overall simulations.

Figure 17:
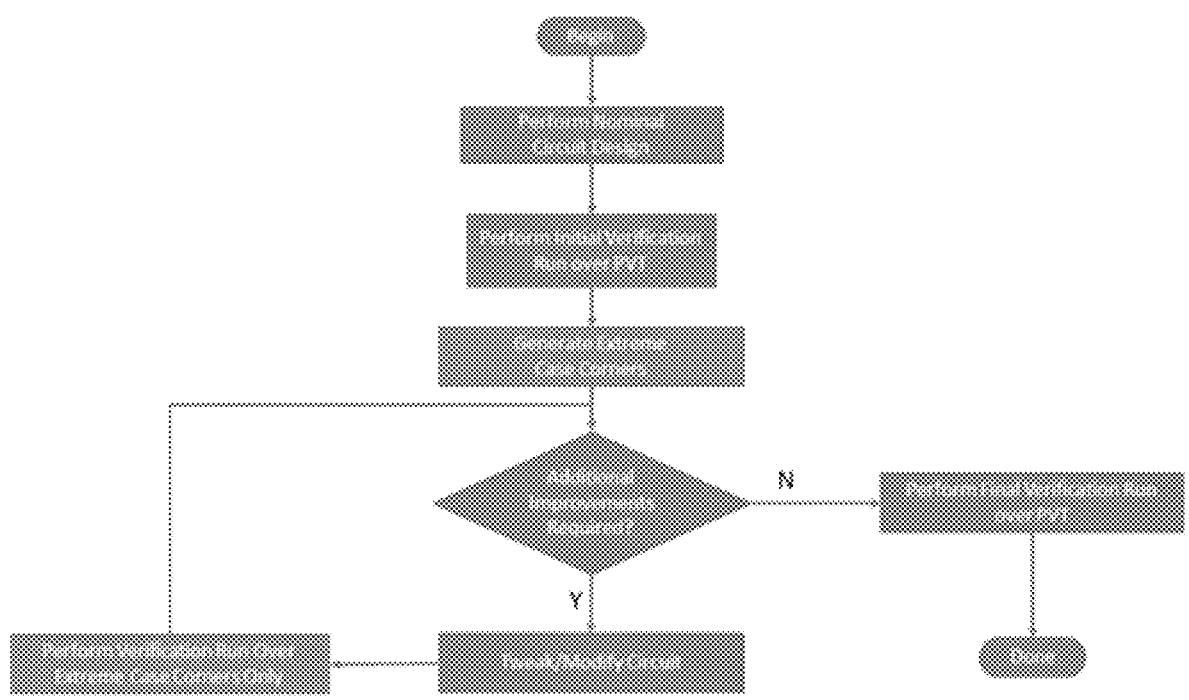

Specifically. the embodiment allows a designer to extract the most 'extreme' cases from the various measurement results across the PVT variation space, and instructs the next round of simulations to simulate only those cases in conjunction with circuit design tweaks or modification as shown in FIG. 17.

The designer is allowed to focus on the 'worst' behaving cases and attempts to fix those first. This leveraging of designer expertise fixes for the 'worst' case samples and will also improve some or many of the other cases, (or at least not dis-improve them). After modifying the circuit one or more times and re-simulating the extreme condition cases, the designer can then perform a final verification check of the modified design across all the original PVT samples. (This verification step is necessary since some of the design 'fixes' for the extreme PVT cases, while improving the performances of those cases, may, at the same time, cause some degradations to some of the previously simulated non-extreme cases.

Figure 18:
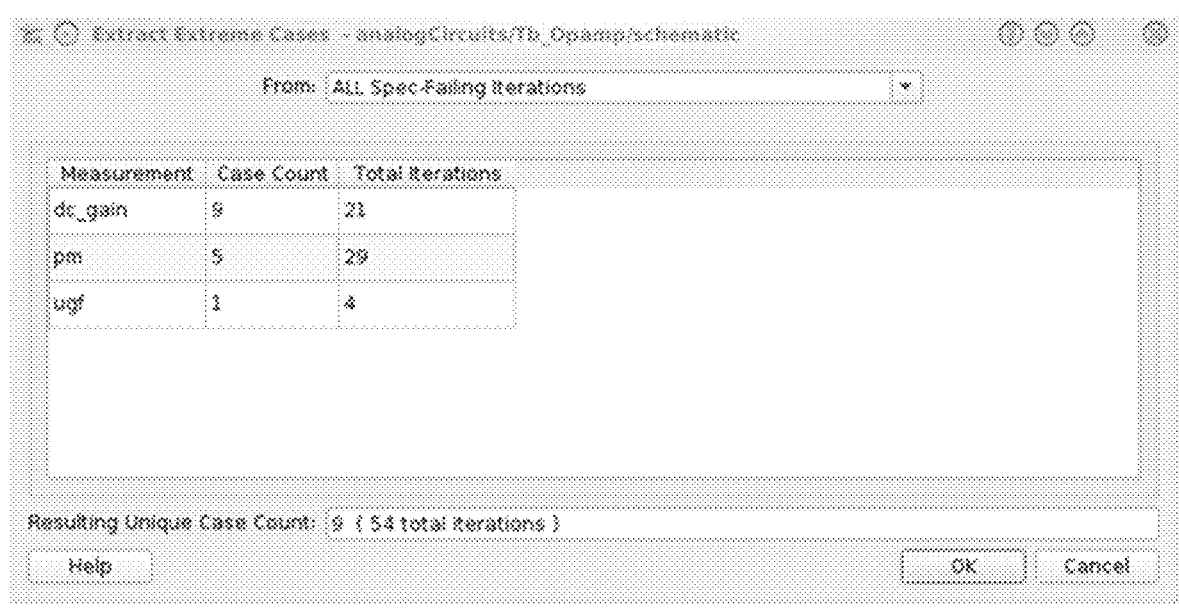

An exemplary GUI facilitating the optimized flow of FIG. 17 is shown in FIG. 18. Here, the designer has chosen to select the PVT sample conditions (effectively the 'rows' of FIG. 13) that correspond to any of the circuit measurements failing its specification. All measurements/specifications are to be considered, as shown in the 'From' dropdown menu at the top of the GUI. In response, the tool shows the 'Case Count' i.e. number of unique 'outer loop' corner combination cases representing the sweep/corner variable combinations, and the number of total sample points/iterations which are to be re-run when the corresponding failing Monte Carlo iterations (failing process parameter values) are also considered within the inner loop. In this example, consider the 'pm' Phase Margin measurement, there are 5 unique combinations of voltage and temperature values (Case Count) which need to be re-run, in addition to some number (not shown) of Monte Carlo iterations leading to a total of 29 unique iterations to reproduce those 29 Phase Margin (PM) measurement failures. (Note that this total number correlates to the 29 violations reported in the summary results table of FIG. 14). Likewise, per the first row of FIG. 18 there are 9 unique corner combinations of voltage and temperature that will need to be re-run to verify that the circuit modifications have improved the DC Gain behavior of the circuit to the point of passing their specifications, including some subset (again, not shown) of the Monte Carlo iterations for a total of 21 total sample points in PVT space. In this example, for the UGF measurement, there is only a single combination of voltage/temperature values that need to be re-run, but 4 Monte Carlo samples, as shown in the last row of FIG. 18.

The example discussion on FIG. 18 and Extreme Case extraction so far considered all the 'extreme' cases PVT conditions where any of the circuit specifications failed to meet their specifications. This represents one useful definition of 'Extreme'. However, the designer may wish to consider more, or less sample points than these. For example, the designer may choose to re-simulate only those PVT conditions in which the single most extreme values (global minimum or maximum) for any circuit measurement were found. For the DC_GAIN case, this would be the one single PVT combination that leads to the smallest value of DC_GAIN (effectively the conditions corresponding to row 1 of FIG. 13). For the UGF case, it may be a different row i.e. a different one of the 450 PVT samples considered in the initial run of simulations, and likewise for the PM measurement. Having fixed the circuit for these 'outer' extremes, a designer may then expect the fix to benefit all the remaining PVT sample points, and so once again re-simulate everything with the newly modified circuit. This represents another useful definition of 'Extreme'.

In the case where there are relatively few specification failing measurements, but perhaps a significant number of 'marginal' cases which come close to failing measurements, a designer may choose yet a different set of extremes, corresponding to the 'tails' of the measurement distributions shown in the histogram(s) of FIG. 12. The designer may want to verify that a candidate design modification simultaneously improves all of the 'tails', while degrading none of them to the point of experience specification failures once more. Since the table of FIG. 13 is sorted in increasing order of DC_GAIN measurement, the rows towards the top of the table can be considered the left 'tails' for that measurement.

Figure 19:
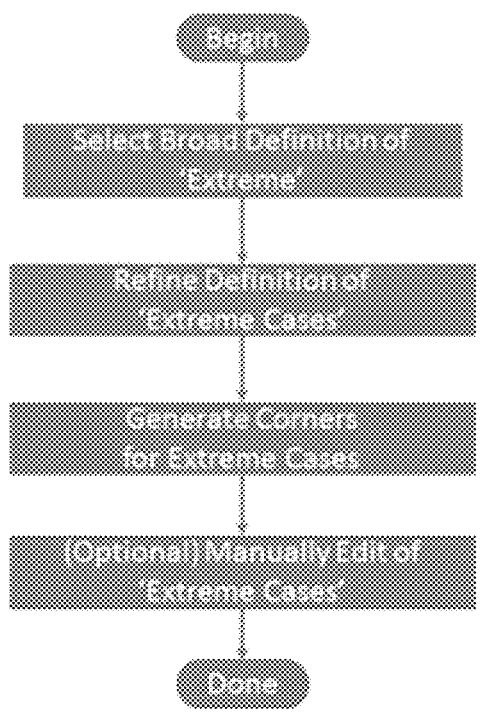
Figure 20:
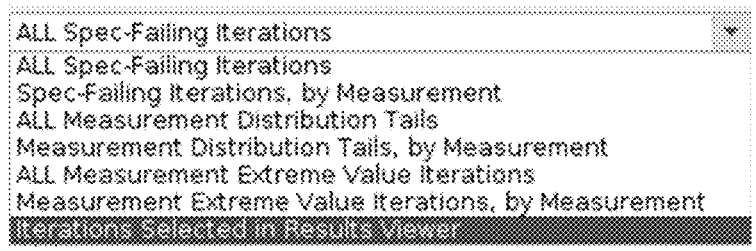
FIG. 20 Different 'Extreme' Definitions

To cater to these various scenarios and definitions of 'extremes', a second embodiment provides various choices to the designer as shown in the flowchart of FIG. 19, and the corresponding GUI of FIG. 20.

FIG. 19 allows the designer to choose an appropriate definition of 'Extreme' from a list of pre-defined choices. Based on the designer's selection, corresponding candidate PVT sample points are chosen and presented. The designer may further refine these PVT sample points by selecting a subset of them, for example on a per-measurement basis. A set of 'Extreme Case' corners with corresponding Monte Carlo iteration indices are then generated in response to the designer inputs, and these Extreme Case corner definitions can optionally be further edited by the designer.

Figure 21:
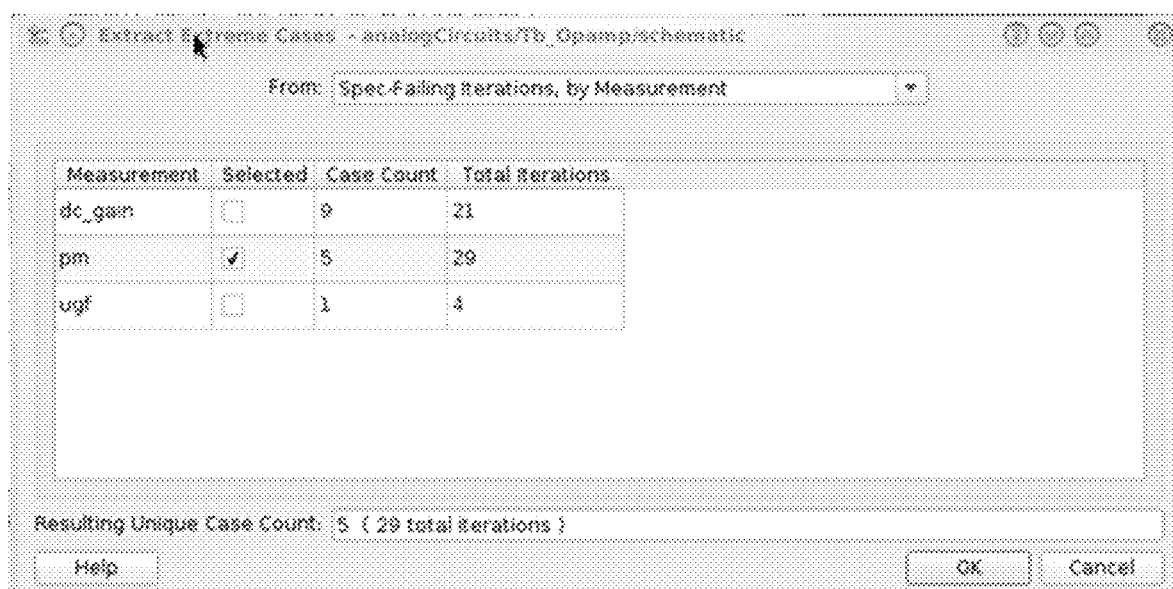
FIG. 21 Selection of PM Measurement (only) Spec-failing PVT samples
Figure 22:
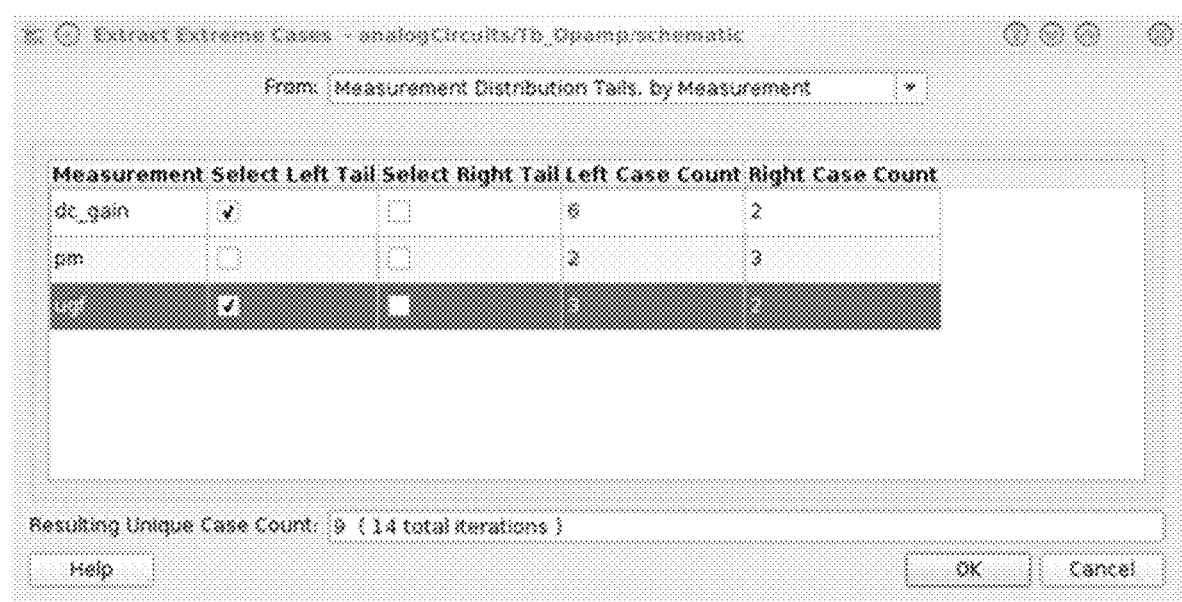
FIG. 22 Selection of Left Distribution Tail PVT Samples for DC Gain and Unity Gain Frequency (UGF) Measurements FIG. 23 Process for Generation of Extreme Corner Cases FIG. 24 Creation of 14 Debug Cases Analysis, while 'regular' PVT analyses (corners, sweeps, Monte Carlo) are disabled FIG. 25 Extreme Case Detail Dialog, allows Selective Enabling and Additional Editing of Extreme Case Definitions FIG. 26 Details on 11 9 Extreme Case Definitions, showing 14 Unique PVT Samples FIG. 27 Algorithmic Summary of Extreme Case Corners Method FIG. 28 Reverting to the full PVT sample set for Final Verification FIG. 29 Optimized Flow Chart for Design Refinement using Extreme Corner Cases, with Multiple Loops FIG. 30 Operational Amplifier with Modified Bias Resistor Topology FIG. 31 Highlighted Differences in Random Number Sequences FIG. 32 Highlighted Differences in Random numbers for one Device Model Parameter FIG. 33 Modified Flow Chart, to Correctly Handle Design Topology Changes FIG. 34 Effective Full Verification Algorithm/Flow, Including Saving/Loading Variation Terms To/From Sampling File FIG. 35 Use of Process Parameter Sampling File without Extreme Case Corner Generation

FIG. 20 through FIG. 22 show portions of a graphical user interface enabling the flow of FIG. 19.

In FIG. 20 several scenarios corresponding to common useful definitions of 'Extreme' are presented to the designer, who can choose from any of these scenarios. In another embodiment, the designer or CAD team customizing the software may be able to provide yet more definitions of extremes (e.g. to simulate the worst 10 (or any other fixed number), Or to simulate only those points that fell outside a certain sigma limit e.g. those outside the 3.0 sigma limit of the original 450 sample points.

The designer may also choose to focus on a single measurement, or a group of measurements, rather than trying to simultaneously re-simulate and fix all of the extreme cases for all of the measurements. In yet another embodiment the designer may generate extreme cases from 'Spec-Failing Iterations, by Measurement' as shown in FIG. 21. In this example, the designer has opted to re-simulate only the extreme cases where the Phase Margin (PM) measurement was failing its specification, resulting in 5 unique corner combinations of voltage and temperature, along with some failing Monte Carlo iterations (again not shown) for a total of 29 total re-simulations to be performed.

Likewise, in an embodiment, the tool offers the designer the choice to select 'tails' on a per-measurement basis. In one embodiment, the number of tails is automatically chosen as a function of the total number of simulations which were originally performed. In an alternative embodiment, the designer may specify the number of tails. In this case, the PVT samples are searched to find those cases which correspond to the N observed 'worst case' values for each selected measurement, where N is the number of tails. In yet another embodiment, the 'left' tail (those unique PVT sample points corresponding to the N smallest values for each measurement) can be selected, or the 'right' tail (those unique PVT sample points corresponding to the N largest values for each measurement) can be selected, or both tails can be selected. This is shown in operation in the screenshot of FIG. 22.

Hence, the GUI of FIG. 18 through FIG. 22 makes it very easy for the designer to select the 'extreme' cases for which they want to debug/improve the circuit, for various useful definitions of 'extreme'.

Figure 23:
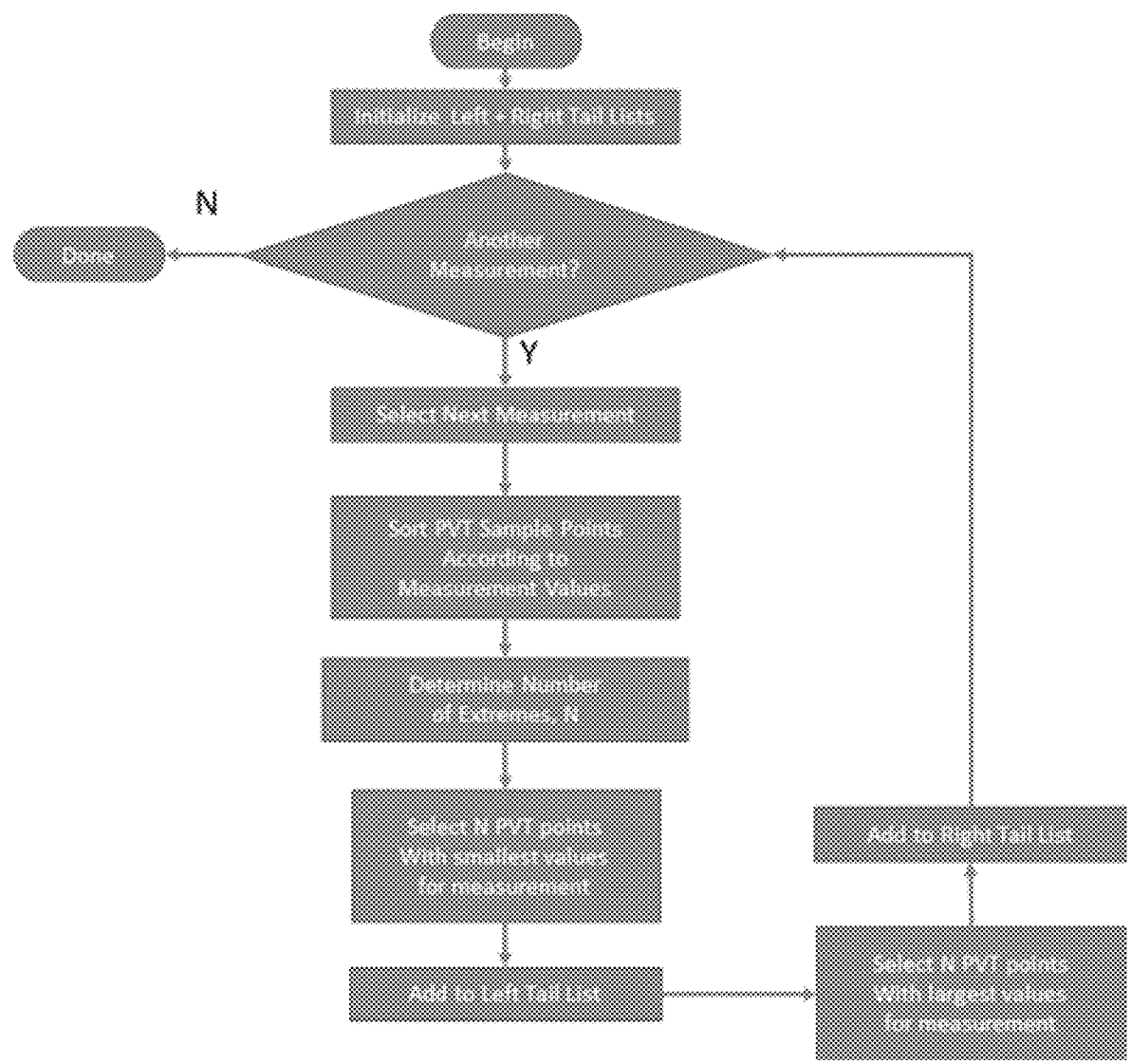

In response to the user pressing the 'OK' button on the 'Extract Extreme Cases' dialog discussed above, a set of extreme cases are then selected, and a set of Extreme Corners are generated that represent those cases. During the generation of those Extreme Corners, the process of FIG. 23 is generally followed. The value of 'N' in FIG. 23 is a function of the definition of 'Extreme', as listed in FIG. 20, and N is chosen per:

When the definition of 'Extreme' is either 'All Spec-Failing Iterations' or 'Spec-Failing Iterations', by 'Measurement', the number of tails is determined by the number of PVT samples for which the corresponding measurement failed to meet specification.

When the definition of 'Extreme' is either of 'All Measurement Distribution Tails' or 'Measurement Distribution Tails, by Measurement', the number of tails is selected as a function of the overall number of PVT samples, such that there is a log-log relationship between the number of tails and the overall number of PVT samples, using an appropriate function.

When the definition of 'Extreme' is either of 'ALL Measurement Extreme Value Iterations;' or 'Measurement Extreme Value Iterations, by Measurement, the value of N is hardcoded to 1 (the single extreme largest and smallest measurement values are considered only, and the corresponding PVT samples identified.

When set to 'Iterations selected in Results Viewer', the user manually gets to select the PVT samples using another component within the software (Results Viewer Table, as shown in FIG. 13).

FIG. 24 shows (first row) a summary of the automatically generated set of 14 Extreme Corner sample (iteration) cases which were generated by the software in response to the user selection of FIG. 22.

These correspond to 9 unique voltage and temperature corner combinations listed at the bottom ('Resulting Unique Case Count') of FIG. 22, along with various Monte Carlo iterations that vary on a per corner case basis, and can be inspected in more detail by double clicking on that first row of the table of FIG. 24. Note that 14 extreme corner cases to be re-verified after initial verification of 450 test cases, means only about 3.1% of the test cases are run in the re-verification step. It is preferred that no more than 10% of the test cases be selected for running in re-verification after circuit adjustment, and more preferably no more than 5%. However, the exact number will depend on numerous factors including the extent to which the preliminary circuit design satisfies the performance specifications, the designer's tolerance for yield loss, company policies, and many other factors.

Note that the original corners, sweeps and Monte Carlo analysis are now disabled and shown in a gray background, as seen in the second, third and fourth rows of FIG. 24. In this embodiment, the user is prevented from inadvertently re-simulating all 450 original samples when the intent is to simulate only the Extreme Case samples.

Figure 25:
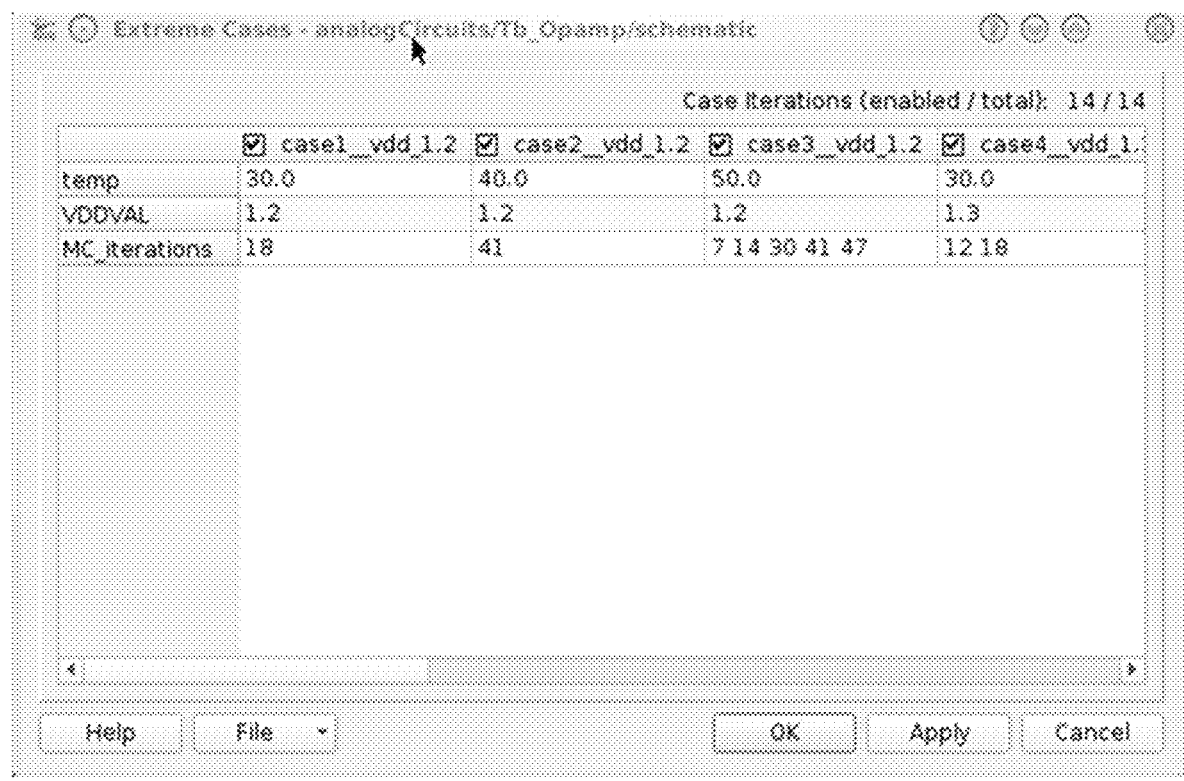

In response to a double click action on the first 'Debug Cases' row of FIG. 24, the 'Extreme Cases' dialog of FIG. 25 appears, allowing the user to see (and further edit if necessary) the specific temperature and voltage values for each of the 9 unique corner combination cases, along with the unique Monte Carlo iterations that correspond to those cases for the 'extreme' conditions. By way of example, the first corner combination case (first column of FIG. 25) reflects a temperature value of 20, along with a VDD voltage value of 1.2 volts, and a Monte Carlo iteration index of #18. In contract, the third column shows that Monte Carlo iterations 7,14,30,41,47 are to be combined with a temperature value of 50 degrees and a voltage value of 1.2 volts. Should there have been additional parameters in the original sweep setup of FIG. 6, or additional corner parameters in the corner setup of FIG. 7, those parameters and their corresponding values would also be captured here as extra rows in FIG. 25.

If the dialog of FIG. 25 were to show all 9 unique corner combination cases, along with their unique Monte Carlo iteration counts, the result would be the table of FIG. 26. FIG. 26 shows that some corner combinations of temperature and VDD values are coupled with only a single Monte Carlo iteration, while some are coupled with two iterations (e.g. the $4^{th}$ column), and some with as many as 5 (the $3^{rd}$ column).

NOTE: To simplify the discussion thus far, the definition of 'Corner' has been limited to a single parameter/value combination (parameter is VDDVAL for voltage, and value is 1.2, 1.25 or 1.3 volts). This is as shown in FIG. 7. However, it is also the case that 'Corner' definitions can include more than one parameter (e.g. multiple voltages could be represented, such as values for VDDA, VSSA, VDDD, VSSD which may represent VDD and VSS voltages for analog and digital components respectively). Corner definitions may also include other parameters representing other physical quantities (e.g. package temperature), or any other value that can be modeled by a parameter in the system.

For simplification, thus far, swept parameter values have also been limited to a single parameter (temp, or temperature), as shown in FIG. 6. In general, however, EDA design environments such as that of FIG. 3, can allow for multiple parameters to have their values swept (including support for nested sweeps). This allows more dimensionality in the PVT sample space, as additional parameters are swept. Again, these additional parameters could be any value of the system that can be represented as a numerical value, including various design variables, operating environment conditions, etc. An example of a second swept parameter might be load capacitance values, when the circuit being simulated is to be coupled with various load conditions.

In an embodiment, therefore, the Extreme Corners aka Debug Cases which are generated to reflect the Extreme cases parameter values and Monte Carlo iterations may include a plurality of parameters and their values. The examples shown so far are limited to a single swept parameter (temperature) and a single corner parameter (voltage) for simplicity of discussion.

The (designer-assisted) generation of the extreme corners from the original lists of multiple swept parameters and/or corners greatly facilitates the debug/design modification/re-simulation process, as once the extreme case corners have been created, (as in FIG. 24, in response to the OK of the 'Extract Extreme Cases' dialog of FIG. 22), the user can immediately proceed to simulation without any additional design environment setup work (the user may still decide to perform some circuit design modifications however). A single click of the Design Environment's 'Run Simulation' button or Menu pick is sufficient to launch the next round of simulations. The newly created 'Extreme Corners' are treated similarly to regular corners (e.g. those of FIG. 7) by the design environment, which leverages designers' familiarity with existing design tools.

In an embodiment, the user may alter those extreme case corners by editing them within the table widget of FIG. 25. For example, a user may change any of the temperature or voltage values, or add additional Monte Carlo iterations, etc. This provides additional flexibility to the 'expert' user (for example allowing additional 'what if analysis' to be performed), while regular users will simply proceed with the Extreme Corners as generated by the tool. This step corresponds to the 'optional manual edit of extreme cases' step in FIG. 19.

The overall flow can be summarized according to the algorithm of FIG. 27.

Reduction of Simulation Effort Due to Extreme Corner Method

During/after Extreme Corner simulation, the user can access the Extreme Corner simulation results at any time, for example to inspect the simulated circuit behavior more closely. The user may perform an iterative process of design modification/tuning, re-running of the extreme corners to see the updated results, subsequently performing another design modification, subsequently running of the extreme corners, etc., until a set of desired results are obtained.

Once the user has finished modifying the circuit and is happy with the new simulation results for the Extreme Corners, the user may now proceed to a final verification, running all the original PVT samples again on the modified design. (This step is typically required to ensure that the design modifications has no inadvertent ill effects on the original 'good' simulations which were within specifications, etc., and is the final step of FIG. 17). To re-run the full set of PVT samples, it's simply a case of the user unchecking the Debug Cases checkbox as shown in the first row of the dialog of FIG. 28, and then re-running the simulation. Note that the unchecking of the Debug Cases checkbox once again enables the original corners, sweeps and Monte Carlo analyses which were temporarily frozen/disabled while Extreme Corners were being simulated/explored during the design refinement process, allowing the user to proceed with a final verification over all original PVT samples.

Figure 29:
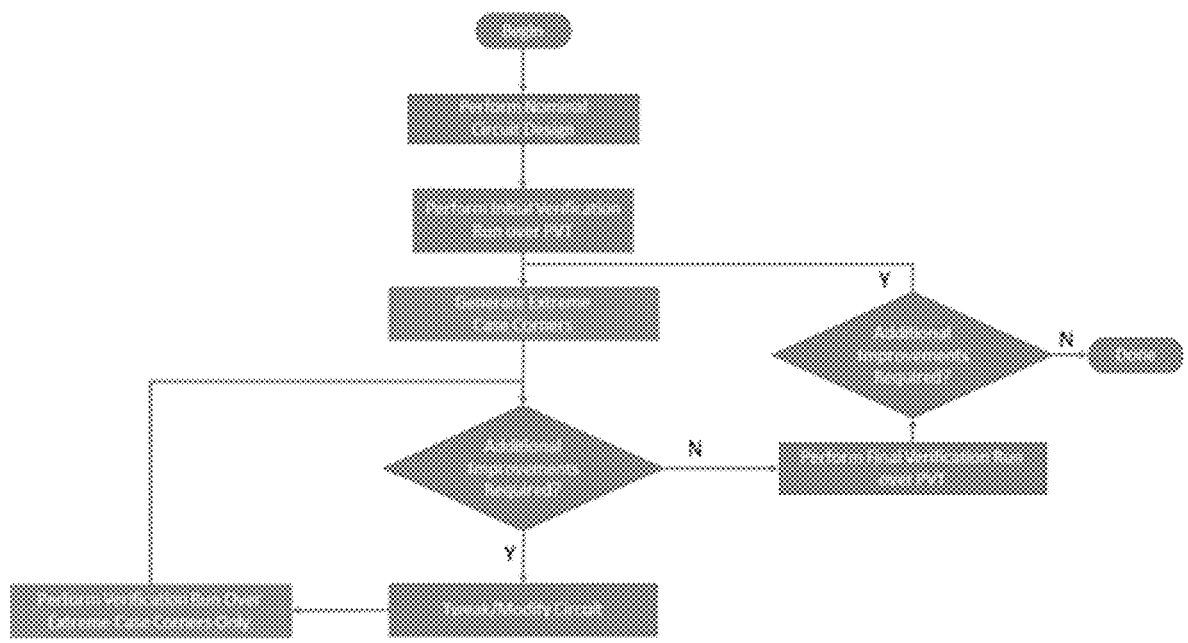

Should any new issues be uncovered when simulating the refined circuit design over the original PVT sample points, the extreme case corner generation/circuit modification/final verification loop may be re-entered, as shown in FIG. 29.

By proceeding in this manner, and assuming no additional improvements are required after the final PVT verification (single loop scenario), the user may reduce the total number of simulations by a substantial amount. Continuing with the example thus far, if the user were to perform 3 design modifications, the total number of simulations would be 450 (original)+14 (Extreme Corners/Iterations)*3+450 (final verification)=942 simulations. Were the user to simply run the full 450 PVT samples at each of the design modification stages, the total number of simulations would be 450 (original)+450*3=1800 iterations (the final verification step is not required, it is implicit in the last simulation run corresponding to the third design modification). The new method therefore provides a reduction in simulation effort and associated CPU cost by (1800−942)/1800=48%. The efficiencies gained can be either higher or lower than this, depending on the original number of Monte Carlo iterations chosen (50 in our example, but hundreds or even thousands may be common), on the number of design modifications required to improve the circuit behavior at the extremities (often, a substantial number are required, leading to a significant overall reduction), and on the number of Extreme Corner cases created. This is one of the reasons that the different definitions of 'Extreme' are supported by the dialog images of FIG. 18 through FIG. 22. In some difficult cases where many subsequent design modifications are required, for a circuit that has a small number of 'Extreme Corners' but for which many Monte Carlo iterations were originally chosen, the reduction in CPU resources may be asymptotically approaching quite close to the theoretical limit of 100%, representing tremendous efficiency.

Reproducing the PVT Sample Conditions in the Presence of Design Topology Modifications As stated above, with modern circuit simulators, the actual sequence of random numbers generated by the circuit simulator as it samples the PVT space at each Monte Carlo iteration is typically a function of the design topology itself (random numbers representing process variations are generated by the simulator as each device in the circuit design is 'visited' by walking the design hierarchy). This can be better appreciated via an example.

One of the modifications that may be made to the circuit of FIG. 1 to improve its behavior at the PVT process extremes is to increase the current flowing in a current mirror reference leg. This results in correspondingly increased currents in the mirror leg(s) of the mirror, often leading to improved circuit behavior, though at the expense of increased current consumption/lower battery life. For example, one of the three bias resistor segments in the lower left corner of FIG. 1 may be removed, as shown in FIG. 30.

Figure 30:
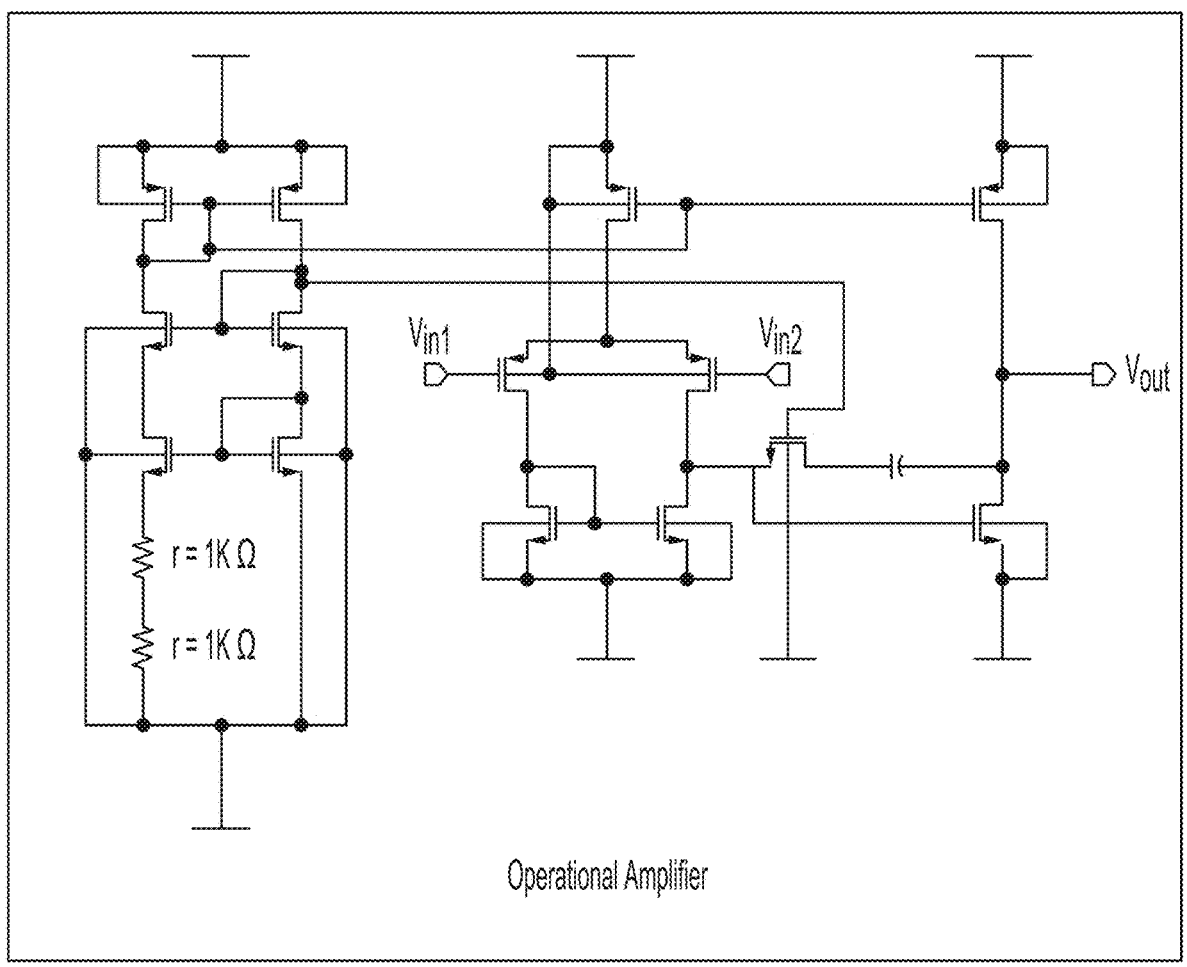
Figure 31:
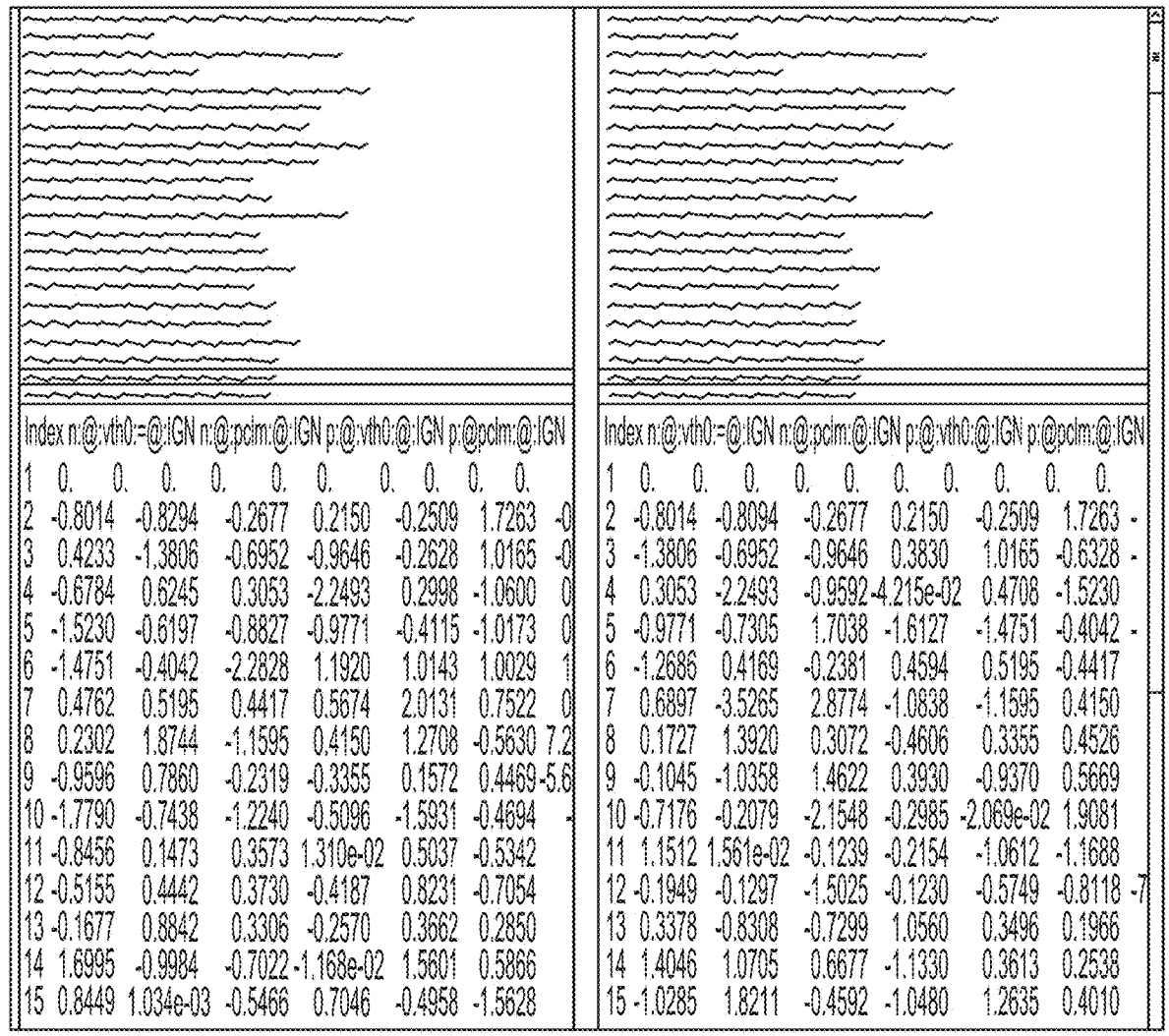

If the pseudo-random numbers representing the 450 PVT samples for the original circuit of FIG. 1 were compared with those representing the modified topology circuit of FIG. 30 using a 'difference' tool, a result similar to that shown in FIG. 31 would be seen. Here, the sampled process parameter value listings for the original circuit are on the right, and those for the modified circuit are on the left. The original circuit involved varied parameter values for 46 unique local variables, while the modified circuit on the left has only 45 local variables (a resistor was removed). Both the left and right images show a table of values, with a column per random variable, and a row per Monte Carlo iteration index. The values in red (rows 3-15 of the table on both sides) represent differences, which are clearly substantial.

Considering the leftmost column of both images, i.e. look at the sequence of random values for just one process parameter, there are differences in the random numbers as shown in FIG. 32. Row 1 represents a 'nominal' simulation in which no variations are applied, and so is the same in both cases. Row 2 represents the first Monte Carlo sample in which variations are applied, and some (the first several columns) of the values are the same in both left and right images (e.g. −0.8014). However, inspecting the columns toward the right, some differences even in row 2 for the first 'real' Monte Carlo simulation are found. From row three (the second real Monte Carlo iteration) onwards, there are differences in all columns.

This reflects the way that modern circuit simulators generate and assign pseudo-random numbers for device models, by walking the circuit design and sampling a new random number for each device encountered. When the topology changes, and devices are added or (as in this case) removed, the sequences are heavily disrupted as shown. Hence, if say row 11 were to correspond to one of the Extreme Corner cases discussed previously, then during the re-simulation of that Monte Carlo iteration with the modified design, *all* the devices in the topically modified circuit would be assigned different random numbers compared with the original simulation of the un-modified circuit. This means that there is no longer have an apples-to-apples' situation, and designers cannot in fact meaningfully compare the re-simulation of the modified circuit with that of the original unmodified circuit at the sample PVT sample point.

Figure 33:
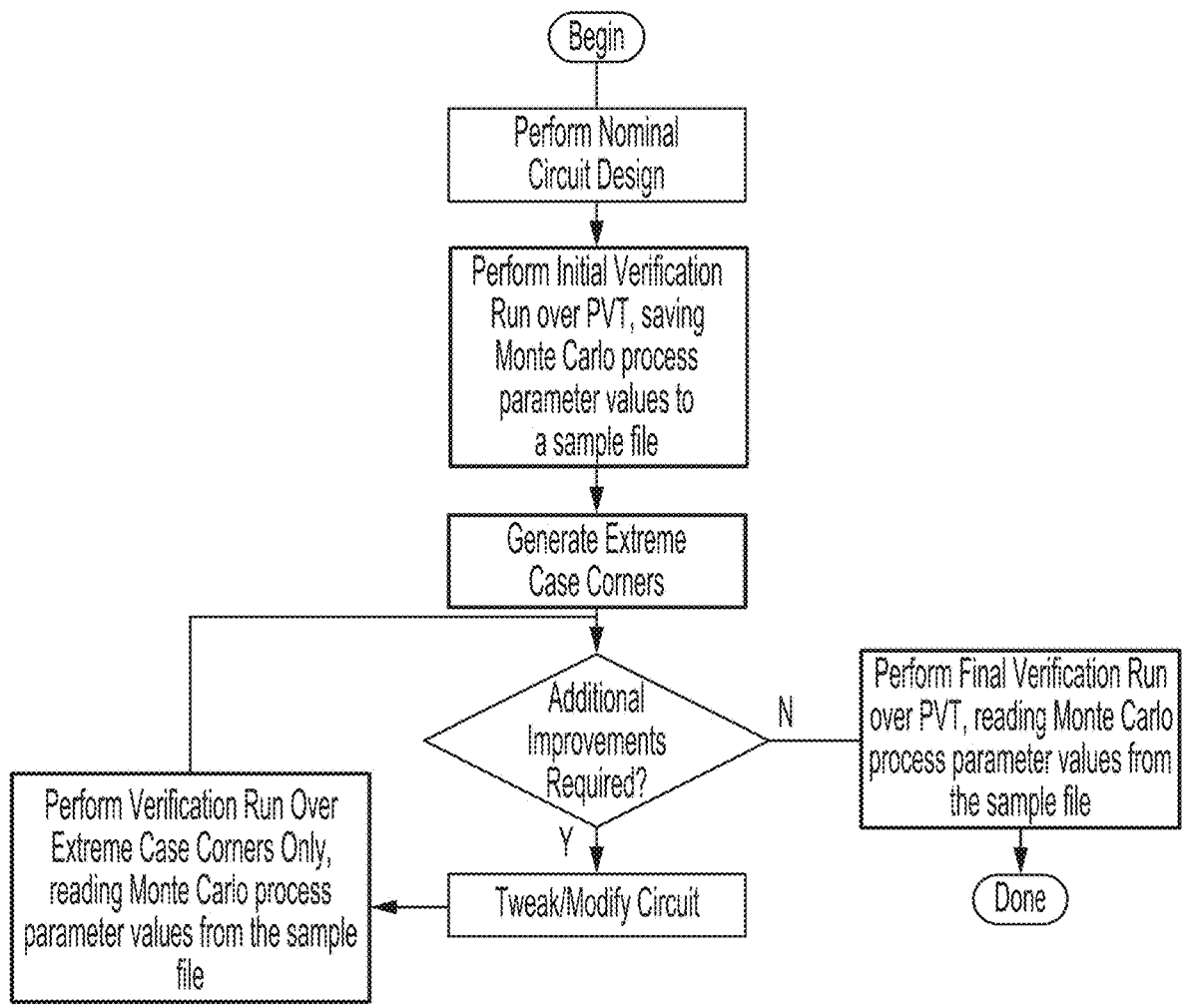

In an embodiment, some new steps are introduced in the process of simulating these modified designs, to compensate for this effect. The overall extreme cases flowchart of FIG. 17 is modified as shown in FIG. 33, and as represented algorithmically in FIG. 34. The new steps represent the saving of the random numbers to a sample file during the initial full PVT simulations, and re-using of those random numbers (where applicable) during subsequent simulations.

First, during the simulation of the initial circuit with the 450 PVT sample points involving 50 Monte Carlo iterations, the circuit simulator is instructed to capture the sequence of random numbers generated for those 50 iterations and to save them to a data file (such as that represented on the right-hand side of FIG. 31). This occurs before the generation of the Extreme Corners. Later, when the Extreme Corners are being simulated for some subset of the Monte Carlo iterations, and when and final Verification runs over PVT are being performed, the simulator is instructed to read the file containing the sequence of random numbers which were generated in that initial step, and to re-use those random numbers rather than attempt to generate a new sequence as is done in the present state of the art.

For any device, which has been removed in the new topology, the columns corresponding to that device in the original file of random numbers can be ignored. In an embodiment, for newly added devices in the new topology, their pseudo-random numbers can be assigned to zero, effectively simulating the newly added devices without any process variation. The devices from the original circuit which are still present in the modified circuit however will see the exact same sequence of random numbers as in the original simulations. Hence, an apples-to-apples scenario is restored, except for the newly added devices. Even though the newly added devices are not receiving any variation during the Extreme Corner re-simulation (they are simulated at their nominal values), their presence in the modified topology is still reflected by the simulation. Their very presence is the main step that the design introduced to improve the overall circuit behavior. During final verification, the newly added devices will see some variation. This means that the results for these simulations will be subtly different from those simulations in which nominal values are used for the newly added devices. But, the differences should be subtle enough to not be significant. And the reason for this is because the mere presence of these devices is often sufficient to fix the original problem (in the original design, these devices were not present). The circuit measurements and design yields should not be particularly sensitive to the parameter value for the newly added devices. Even if those devices behave a little differently from one case to the next due to process variations, those little differences should not materially impact the circuit in a significant way. Hence the method can work well, even though some minor differences in circuit behavior during the final verification step.

Figure 35:
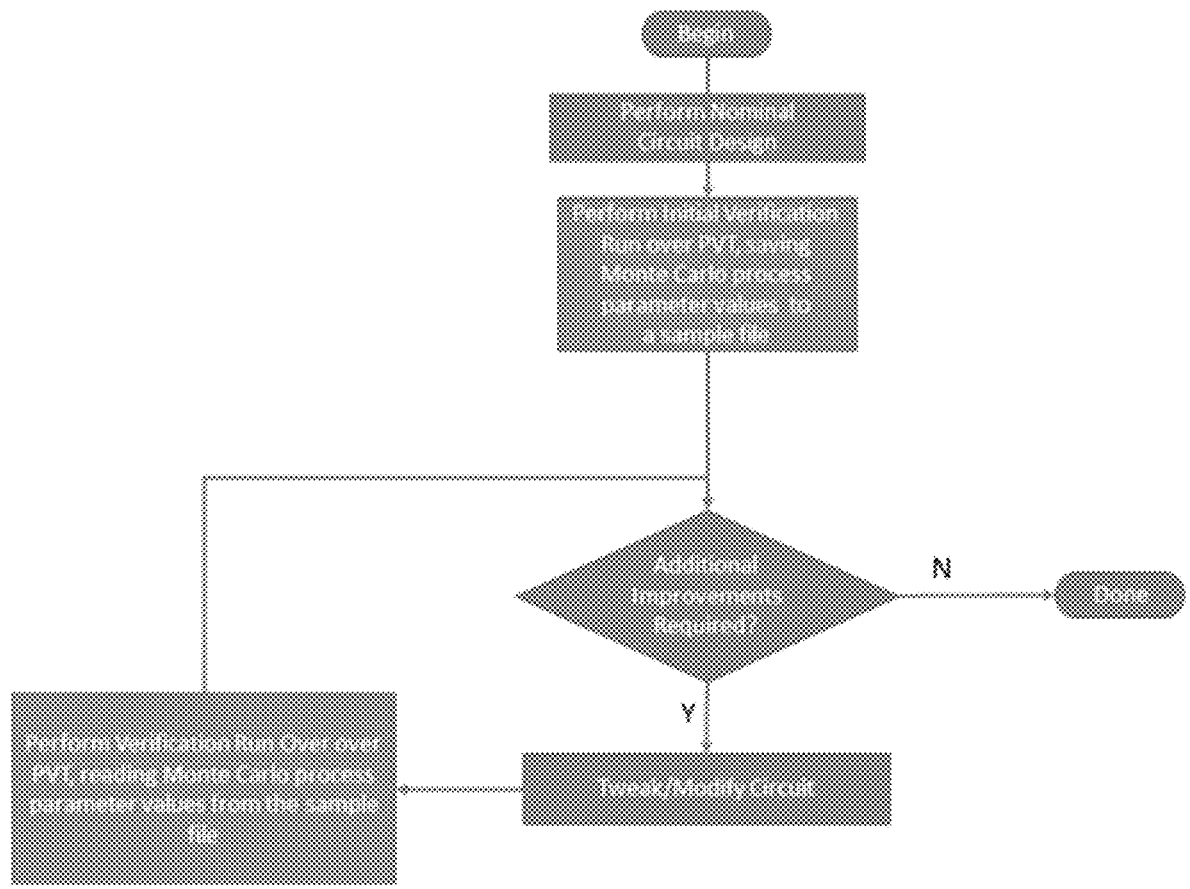

In an embodiment, the sample file method may also be employed without using the Extreme Case corner methodology i.e. when simulating all PVT samples every time the circuit is modified. This is as shown in FIG. 35.

EDA System/Workflow Explanation

Figure 36:
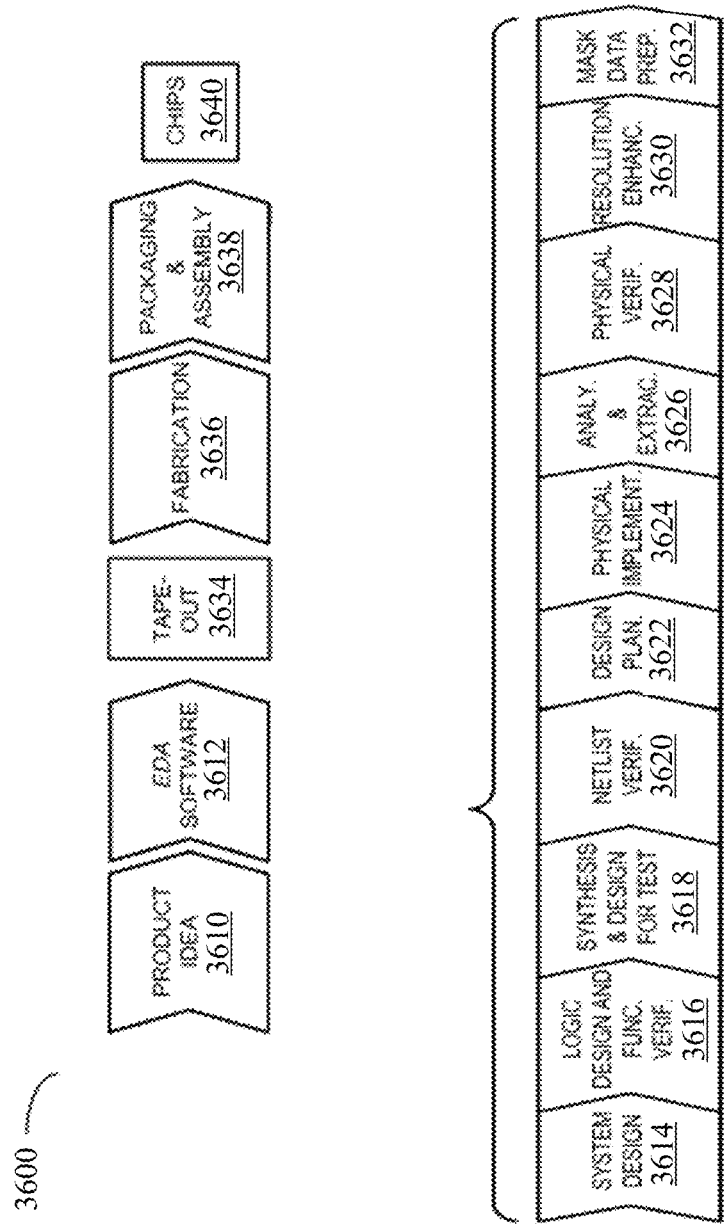
FIG. 36 depicts a flowchart of various operations in the design and fabrication of an integrated circuit in accordance with an embodiment of the present disclosure.

FIG. 36 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 3610 with information supplied by a designer, information which is transformed during a process to create an item of manufacture (referred to herein as a design or device) that uses an EDA software tool 3612, which may also be signified herein as EDA software, as a design tool, or a verification tool. When the design is finalized, it can be taped-out 3634, which typically is when artwork (e.g., geometric patterns) for the integrated circuit is sent to a fabrication facility to manufacture the mask set, which is then used to manufacture the integrated circuit. After tape-out, a semiconductor die is fabricated 3636 and packaging and assembly processes 3638 are performed, which result in the finished integrated circuit 3640 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 3612 includes processes 3614-3632, which are described below. This design flow description is for illustration purposes only and is not meant to limit the present disclosure. For example, an actual integrated circuit design may require a designer to perform the design operations in a different sequence than the sequence described herein.

During system design 3614, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 3616, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During synthesis and design for test 3618, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 3620, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 3622, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 3624, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 3626, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 3628, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 3630, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 3632, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 3612.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

General Computer Explanation

FIGS. 37A, 37B and 37C are simplified block diagrams of a computer system suitable for use with embodiments of the technology, as well as circuit design and circuit embodiments of the technology.

In FIG. 37A, computer system 3710 typically includes at least one computer or processor 3714 which communicates with a number of peripheral devices via bus subsystem 3712. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3724, comprising a memory subsystem 3726 and a file storage subsystem 3728, user interface input devices 3722, user interface output devices 3720, and a network interface subsystem 3716. The input and output devices allow user interaction with computer system 3710.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3710 depicted in FIG. 37A is intended only as one example for purposes of illustrating the preferred embodiments. Many other configurations of computer system 3710 are possible having more or less components than the computer system depicted in FIG. 37A.

Network interface subsystem 3716 provides an interface to outside networks, including an interface to communication network 3718, and is coupled via communication network 3718 to corresponding interface devices in other computer systems or machines. Communication network 3718 may comprise many interconnected computer systems, machines and communication links. These communication links may be wireline links, optical links, wireless links, or any other devices for communication of information. Communication network 3718 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 3722 may include an alpha-numeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3710 or onto communication network 3718. User interface input devices typically allow a user to select objects, icons, text and the like that appear on some types of user interface output devices, for example, a display subsystem.

User interface output devices 3720 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3710 to the user or to another machine or computer system.

Memory subsystem 3726 typically includes a number of memories including a main random-access memory (RAM) 3730 (or other volatile storage device) for storage of instructions and data during program execution and a read only memory (ROM) 3732 in which fixed instructions are stored. File storage subsystem 3728 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3728.

Bus subsystem 3712 provides a device for letting the various components and subsystems of computer system 3710 communicate with each other as intended. Although bus subsystem 3712 is shown schematically as a single bus, alternative embodiments of the bus subsystem may use multiple busses. For example, RAM-based main memory can communicate directly with file storage systems using Direct Memory Access (DMA) systems.

FIG. 37B depicts a memory 3740 such as a non-transitory, computer readable data and information storage medium associated with file storage subsystem 3728, and/or with network interface subsystem 3716, and can include a data structure specifying a circuit design. The memory 3740 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 37C signifies an integrated circuit 3790 created with the described technology that includes one or more cells selected, for example, from a cell library.

As used herein, the term "set" is defined as including at least one member.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Emulation Environment Explanation

Figure 38:
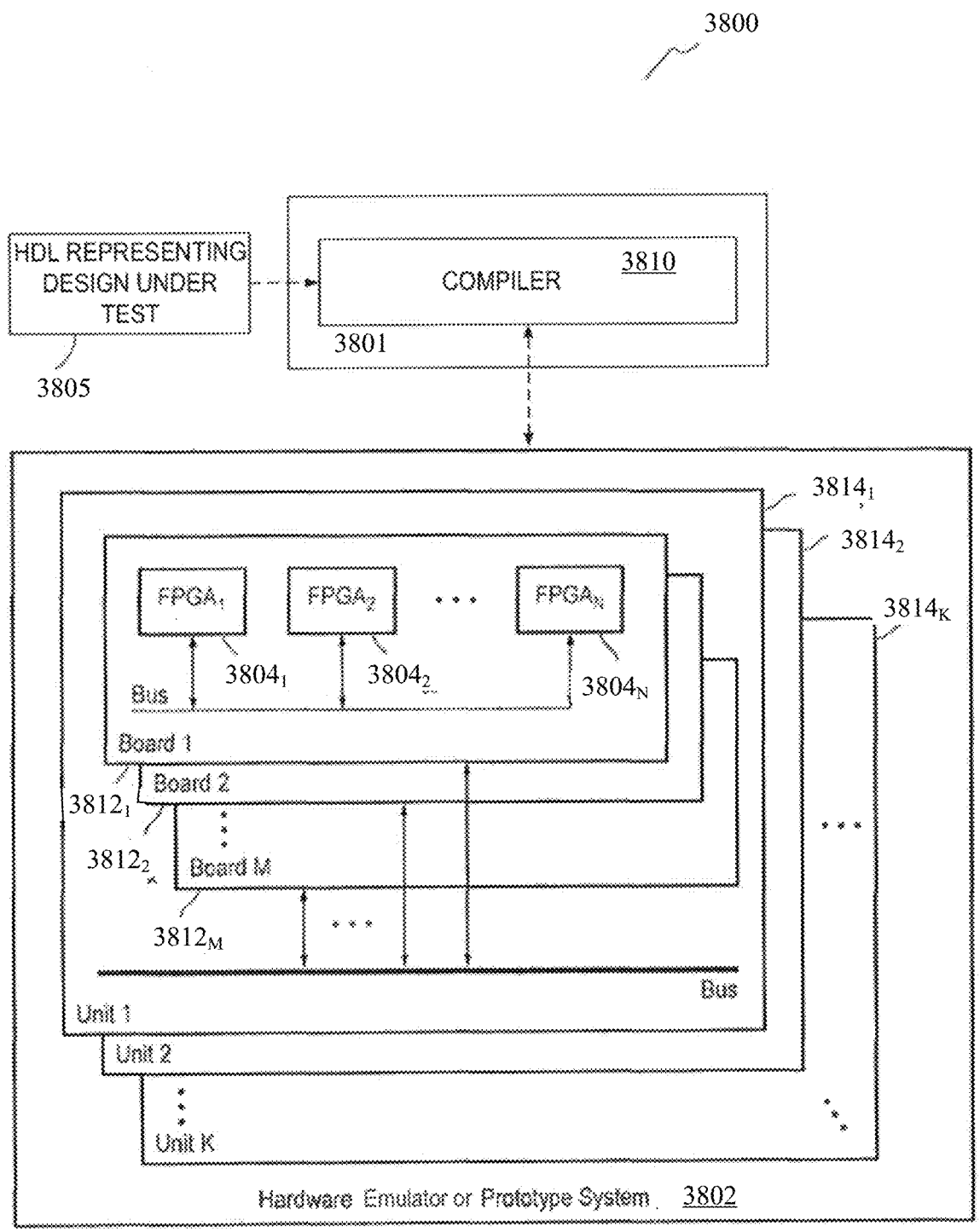
FIG. 38 depicts a block diagram of an emulation system.

An EDA software system, such as element 3612 depicted in FIG. 36 typically includes an emulation system 3616 to verify the functionality of the circuit design. FIG. 38 depicts a typical emulation system which includes a host computer system 3801 (often part of an EDA system) and an emulator system 3802 (typically a set of programmable devices such as Field Programmable Gate Arrays (FPGAs)). The host system generates data and information, typically using a compiler 3810, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

The host system 3801 comprises one or more processors. In the embodiment where the host system is comprised of multiple processors, the functions described herein as being performed by the host system may be distributed among the multiple processors.

The host system 3801 typically includes a compiler 3810 that processes code written in a hardware description language that represents a DUT, producing data (typically binary) and information that is used to configure the emulation system 3802 to emulate the DUT. The compiler 3810 may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices), for example, elements $3804_1$ to $3804_N$ in FIG. 38. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors $3804_1$-$3804_N$ may be placed into one or more hardware boards $3812_1$ through $3812_M$. Many of such boards may be placed into a hardware unit, e.g. $3814_1$. The boards within a unit may be connected using the backplane of the unit or any other types of connections. In addition, multiple hardware units (e.g., $3814_1$ through $3814_K$) may be connected to each other by cables or any other means to form a multi-unit system. In general, the hardware emulation or prototype system 3802 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 3801 receives (e.g., from a user) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically comprises at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 3810 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/reemulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilinx or Intel's Altera), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. This process is discussed in the General Computer Explanation section.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract' } how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A system for yield improvement of an integrated circuit device implementing a circuit design having a set of performance specifications including one or more performance specifications, the system comprising:
   a memory;
   a computer system coupled to the memory, the computer system configured to:
   obtain a first circuit design;
   in a first verification, verify by simulation adherence of the first circuit design to the set of performance specifications, over a first set of test cases which includes variations in one or more of a fabrication process variable and an environmental condition, the first verification including identifying, for each test case of the first set of test cases, an extent to which the first circuit design satisfies one or more performance specifications of the set of performance specifications;
   determine, in dependence upon the first verification, a second set of test cases having test cases fewer than all of the test cases in the first set of test cases;
   provide a second circuit design adjusted in dependence upon the first verification; and
   in a second verification, re-verify by simulation adherence of the second circuit design to the set of performance specifications, over only the second set of test cases.

2. The system of claim 1, wherein the determining of the second set of test cases comprises selecting the second set of test cases in dependence upon an extent of satisfaction of the one or more performance specifications as identified in the first verification of the first circuit design.

3. The system of claim 2, wherein the determining of the second set of test cases comprises selecting the second set of test cases as all cases in the first set of test cases for which at least one performance specification of the one or more performance specifications were not satisfied as identified in the first verification of the first circuit design.

4. The system of claim 2, wherein the determining of the second set of test cases comprises selecting the second set of test cases as one test case in the first set of test cases for which a selected one performance specification of the set of performance specifications was least satisfied, as identified in the first verification of the first circuit design.

5. The system of claim 2, wherein the determining of the second set of test cases comprises selecting the second set of test cases as one selected test case for each performance specification of the set of performance specifications, each test case of the selected cases being one test case in the first set of test cases for which a respective one performance specification of the set of performance specifications was least satisfied, as identified in the first verification of the first circuit design.

6. The system of claim 2, wherein the computer system is further configured to present perceptibly to a user at least a particular subset of test cases in the first set of test cases in association with the extent to which each test case of the particular subset of test cases satisfied at least one performance specification as identified in the first verification of the first circuit design,
   and wherein the determining of the second set of test cases comprises a user manually selecting the second set of test cases.

7. The system of claim 2, wherein the computer system is further configured to present perceptibly to a user a set of available criteria for automatic selection of test cases in the first set of test cases; and
   wherein the determining of the second set of test cases comprises determining the second set of test cases in dependence upon a user-selected criterion of the set of available criteria and further in dependence upon the first verification of the first circuit design.

8. The system of claim 2, wherein the second set of test cases contains no more than 10% of the first set of test cases.

9. The system of claim 1, wherein the second set of test cases contains no more than 5% of the first set of test cases.

10. The system of claim 1, wherein the second verification includes a computer system identifying, for each test case in the second set of test cases, an extent to which the second circuit design satisfies one or more performance specifications of the performance specifications in the set of performance specifications, wherein the computer system is further configured to:
    determine, in dependence upon the second verification, a third set of test cases having test cases fewer than all of the test cases in the first set of test cases;
    provide a third circuit design adjusted in dependence upon the second verification; and
    in a third verification, verify by simulation adherence of the third circuit design to the set of performance specifications, over only the third set of test cases.

11. The system of claim 10, wherein the third set of test cases is not identical to the second set of test cases.

12. The system of claim 10,
    wherein the determining of the second set of test cases comprises selecting the second set of test cases in dependence upon an extent of satisfaction of performance specifications as identified in the first verification of the first circuit design; and
    wherein the determining of the third set of test cases comprises selecting the third set of test cases in dependence upon an extent of satisfaction of performance specifications as identified in the second verification of the second circuit design.

13. The system of claim 10, wherein the first set of test cases includes a respective set of randomly generated Monte Carlo parameter values for each device in a first set of devices in the first circuit design,
    wherein the computer system is further configured to store an identification of the Monte Carlo parameter values from the first set of test cases,
    and wherein the second set of test cases includes the stored set of Monte Carlo parameter values for each device in the first set of devices which remain in the second circuit design.

14. The system of claim 13, wherein the second circuit design includes all test cases devices from the first set of devices,
    and wherein the second set of test cases includes all of the sets of Monte Carlo parameter values.

15. The system of claim 13, wherein the second circuit design includes an additional device not included in the first set of devices,
    and wherein the second set of test cases includes Monte Carlo parameter values for the additional device which are interpreted in the second verification as not varying from nominal values for the additional device.

16. The system of claim 13, wherein the second circuit design omits a particular device from the first set of devices,
    and wherein the second set of test cases omits the set of Monte Carlo parameter values for the particular device.

17. The system of claim 1, wherein the computer system is further configured to, in a third verification, re-verify by simulation adherence of the second circuit design to the set of performance specifications, over the entire first set of test cases.

18. A system for yield improvement of an integrated circuit device implementing a circuit design having a set of performance specifications including one or more performance specifications, the system comprising:
a memory;
a computer system coupled to the memory, the computer system configured to:
obtain a first circuit design;
in a first verification, verify by simulation adherence of the first circuit design to the set of performance specifications, over a first set of test cases which includes variations in one or more of a fabrication process variable and an environmental condition, the first verification including identifying, for each test case of the first set of test cases, an extent to which the first circuit design satisfies one or more performance specifications of the set of performance specifications, the first set of test cases including a respective set of randomly generated Monte Carlo parameter values for each device in a first set of devices in the first circuit design;
store an identification of a set of Monte Carlo parameter values for each device in the first set of devices from the first set of test cases;
determine, in dependence upon the first verification, a second set of test cases in dependence upon the first set of test cases;
provide a second circuit design adjusted in dependence upon the first verification; and
in a second verification, re-verify by simulation adherence of the second circuit design to the set of performance specifications, over the second set of test cases,
wherein the second set of test cases includes the stored set of Monte Carlo parameter values for each device in the first set of devices which remain in the second circuit design.

19. The system of claim 18, wherein the second circuit design includes all devices from the first set of devices,
and wherein the second set of test cases includes all of the sets of Monte Carlo parameter values.

20. The system of claim 18, wherein the second circuit design includes an additional device not included in the first set of devices,
and wherein the second set of test cases includes Monte Carlo parameter values for the additional device which are interpreted in the second verification as not varying from nominal values for the additional device.

21. The system of claim 18, wherein the second circuit design omits a particular device from the first set of devices,
and wherein the second set of test cases omits the set of Monte Carlo parameter values for the particular device.

22. A method for yield improvement of an integrated circuit device implementing a circuit design having a set of performance specifications including one or more performance specifications, the method comprising:
a computer system obtaining a first circuit design;
in a first verification, a computer system verifying by simulation adherence of the first circuit design to the set of performance specifications, over a first set of test cases which includes variations in one or more of a fabrication process variable and an environmental condition, the first verification including identifying, for each test case of the first set of test cases, an extent to which the first circuit design satisfies one or more performance specifications of the set of performance specifications;
determining, in dependence upon the first verification, a second set of test cases having test cases fewer than all of the test cases in the first set of test cases;
providing a second circuit design adjusted in dependence upon the first verification; and
in a second verification, a computer system re-verifying by simulation adherence of the second circuit design to the set of performance specifications, over only the second set of test cases.

23. The method of claim 22, wherein the determining of the second set of test cases comprises selecting the second set of test cases in dependence upon an extent of satisfaction of the one or more performance specifications as identified in the first verification of the first circuit design.

24. The method of claim 23, wherein the second verification includes a computer system identifying, for each test case in the second set of test cases, an extent to which the second circuit design satisfies one or more performance specifications in the set of performance specifications, the method further comprising:
determining, in dependence upon the second verification, a third set of test cases having test cases fewer than all of the test cases in the first set of test cases;
providing a third circuit design adjusted in dependence upon the second verification; and
in a third verification, a computer system verifying by simulation adherence of the third circuit design to the set of performance specifications, over only the third set of test cases.

25. The method of claim 24, wherein the first set of test cases includes a respective set of randomly generated Monte Carlo parameter values for each device in a first set of devices in the first circuit design,
further comprising storing an identification of the Monte Carlo parameter values from the first set of test cases,
and wherein the second set of test cases includes the stored set of Monte Carlo parameter values for each device in the first set of devices which remain in the second circuit design.

26. The method of claim 22, further comprising in a third verification, a computer system re-verifying by simulation adherence of the second circuit design to the set of performance specifications, over the entire first set of test cases.

27. A method for yield improvement of an integrated circuit device implementing a circuit design having a set of performance specifications including one or more performance specifications, the method comprising:
a computer system obtaining a first circuit design;
in a first verification, a computer system verifying by simulation adherence of the first circuit design to the set of performance specifications, over a first set of test cases which includes variations in one or more of a fabrication process variable and an environmental condition, the first verification including identifying, for each test case of the first set of test cases, an extent to which the first circuit design satisfies one or more performance specifications of the set of performance specifications, the first set of test cases including a respective set of randomly generated Monte Carlo parameter values for each device in a first set of devices in the first circuit design;
storing an identification of a set of Monte Carlo parameter values for each device in the first set of devices from the first set of test cases;

determining, in dependence upon the first verification, a second set of test cases in dependence upon the first set of test cases;

providing a second circuit design adjusted in dependence upon the first verification; and in a second verification, a computer system re-verifying by simulation adherence of the second circuit design to the set of performance specifications, over the second set of test cases, wherein the second set of test cases includes the stored set of Monte Carlo parameter values for each device in the first set of devices which remain in the second circuit design.

\* \* \* \* \*